(12) United States Patent
Takemoto

(10) Patent No.: US 10,095,010 B2
(45) Date of Patent: Oct. 9, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Shoichi Takemoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/647,849

(22) Filed: Jul. 12, 2017

(65) Prior Publication Data

US 2018/0045928 A1 Feb. 15, 2018

(30) Foreign Application Priority Data

Aug. 9, 2016 (JP) ................. 2016-156315

(51) Int. Cl.
G02B 15/167 (2006.01)
G02B 15/28 (2006.01)

(52) U.S. Cl.
CPC ........... *G02B 15/167* (2013.01); *G02B 15/28* (2013.01)

(58) Field of Classification Search
CPC ............................. G02B 15/167; G02B 15/28
USPC ................. 359/682, 684, 746, 753, 763–770
See application file for complete search history.

(56) References Cited

U.S. PATENT DOCUMENTS

| | | | |
|---|---|---|---|
| 9,052,496 B2 * | 6/2015 | Kawamura | G02B 15/173 |
| 9,176,307 B2 * | 11/2015 | Hayakawa | G02B 15/173 |
| 9,261,682 B2 * | 2/2016 | Ogata | G02B 27/64 |
| 9,335,528 B2 * | 5/2016 | Fujisaki | G02B 15/14 |
| 9,557,538 B2 * | 1/2017 | Amano | G02B 15/177 |
| 9,618,728 B2 * | 4/2017 | Tomioka | G02B 13/0045 |
| 9,645,369 B2 | 5/2017 | Takemoto | |
| 9,709,781 B2 | 7/2017 | Takemoto | |
| 9,720,216 B2 * | 8/2017 | Noda | G02B 15/20 |
| 9,746,649 B2 * | 8/2017 | Noda | G02B 15/173 |
| 9,746,650 B2 * | 8/2017 | Noda | G02B 15/173 |
| 2015/0362711 A1 | 12/2015 | Wakazono et al. | |

(Continued)

FOREIGN PATENT DOCUMENTS

| | | |
|---|---|---|
| JP | 2012-047814 A | 3/2012 |
| JP | 2013-015743 A | 1/2013 |

*Primary Examiner* — William R Alexander
*Assistant Examiner* — Grant Gagnon
(74) *Attorney, Agent, or Firm* — Carter, Deluca, Farrell & Schmidt, LLP

(57) ABSTRACT

A zoom lens includes, in order from object-side, a fixed positive first group including three-or-more lenses, a negative second group including a unit moving toward image-side during zooming toward telephoto-end, a positive third group including a unit moving toward object-side during zooming from wide-end to telephoto-end, a negative fourth group moving during zooming and focusing, and a rear group. Focal lengths of the first group and the zoom lens at wide-end, a movement amount of a unit moving by largest amount during zooming toward telephoto-end in the second group, a largest value of position change between wide-end and telephoto-end of units moving toward an object side during zooming from wide-end to telephoto-end, refractive index for d-line of a positive lens closest to image-side in the first group, and average refractive index for d-line of positive lenses of the first group other than the positive lens are appropriately set.

10 Claims, 19 Drawing Sheets

(56) References Cited

U.S. PATENT DOCUMENTS

2017/0108680 A1 4/2017 Kikuchi et al.
2017/0269374 A1 9/2017 Takemoto et al.

* cited by examiner

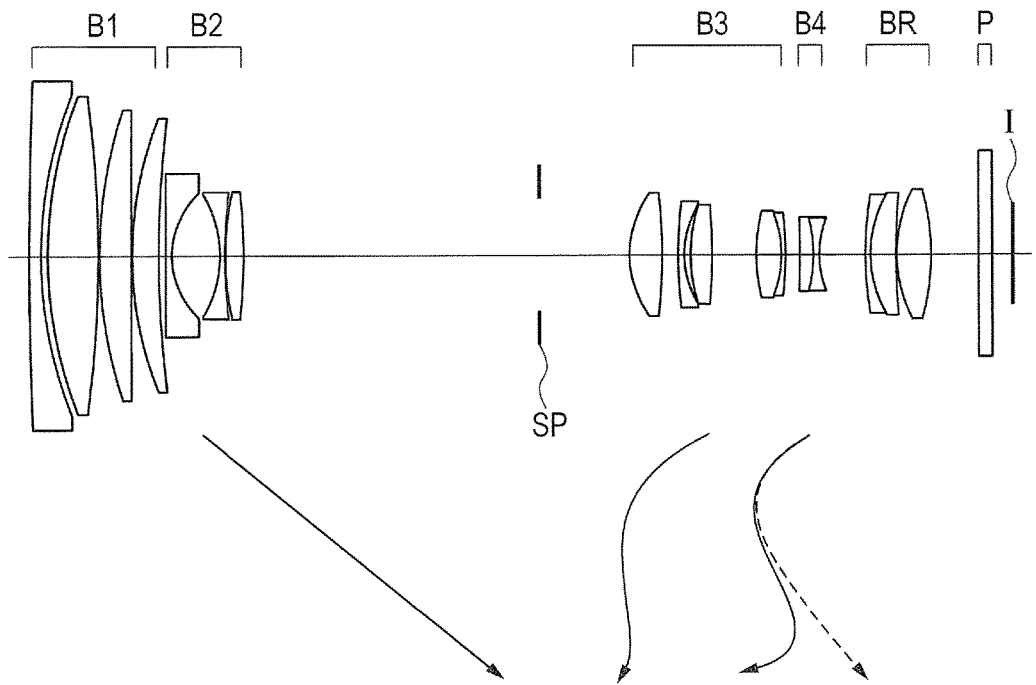
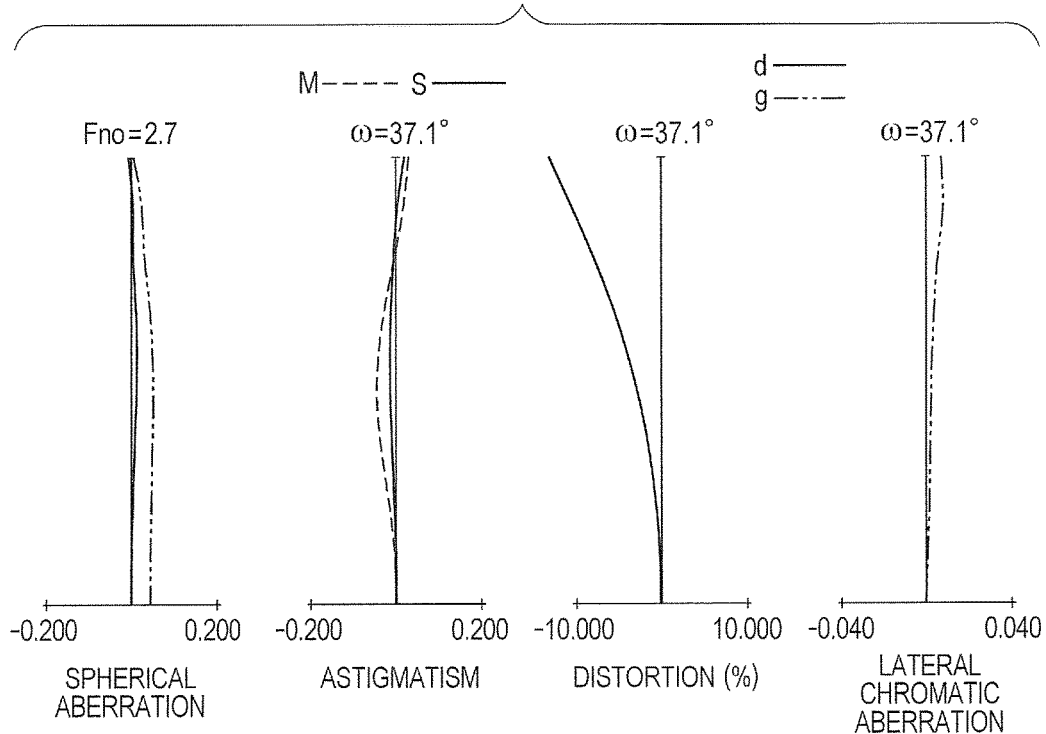

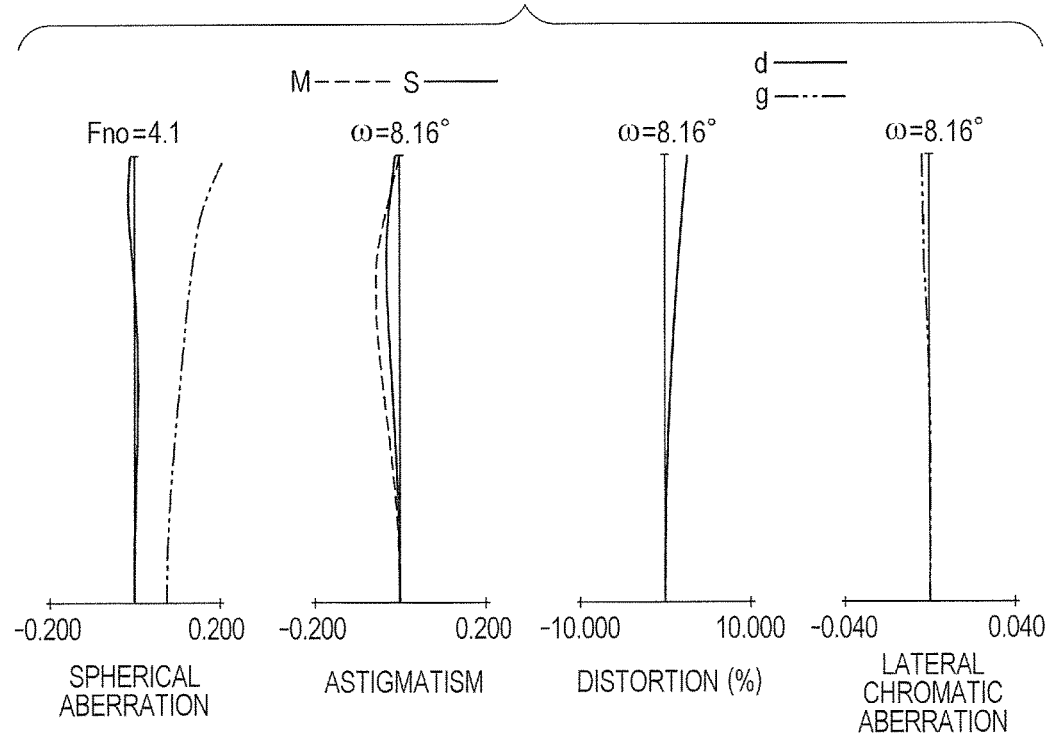
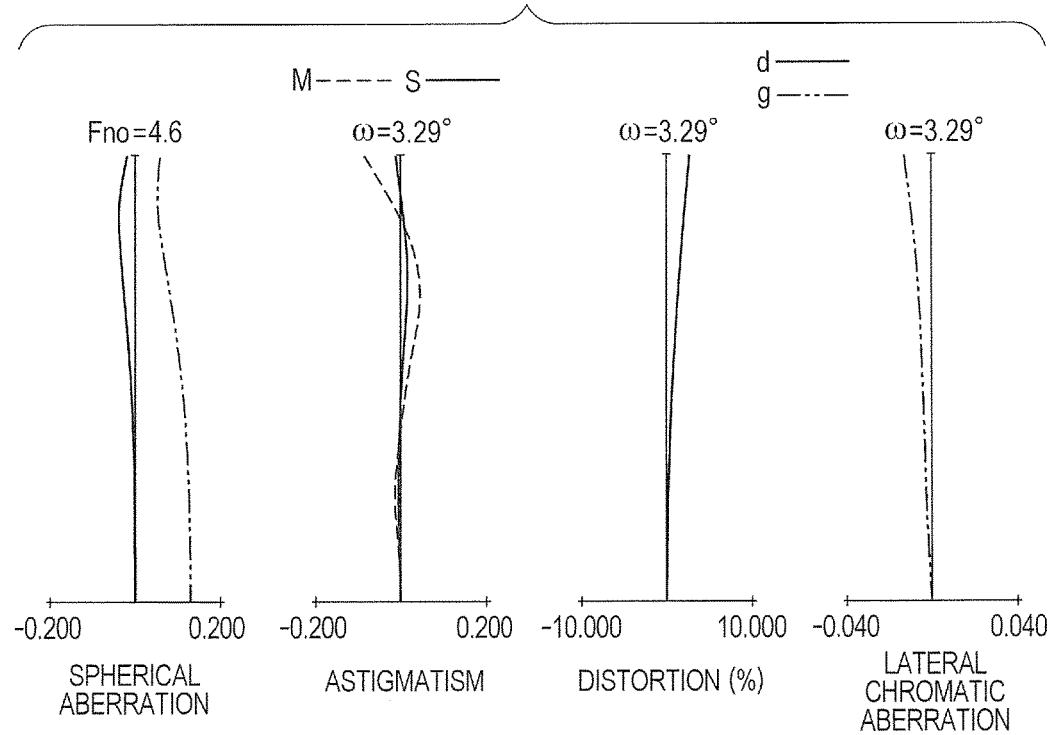

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, and more specifically, to a zoom lens which is suitably used as an image pickup optical system used in an image pickup apparatus, for example, a digital still camera, a video camera, a monitoring camera, or a broadcasting camera.

Description of the Related Art

In recent years, downsizing of the overall sizes of apparatus using solid-state image pickup elements, such as digital still cameras and video cameras, has been achieved. As image pickup optical systems used in such apparatus, there is a demand for bright zoom lenses having a high zoom ratio and high optical performance over the entire zoom range, for example. Meanwhile, large-size solid-state image pickup elements are demanded in order to obtain images having high image quality and a shallow depth of field, whereas further downsizing of zoom lenses is demanded.

There has hitherto been known a five-unit zoom lens including, in order from an object side to an image side, a first lens unit to a fifth lens unit having positive, negative, positive, negative, and positive refractive powers.

For example, in Japanese Patent Application Laid-Open No. 2013-015743, there is disclosed a lens including, in order from an object side, lens units having positive, negative, positive, negative, and positive refractive powers, in which the second lens unit, the third lens unit, and the fifth lens unit are configured to move during zooming. In Japanese Patent Application Laid-Open No. 2012-047814, there is disclosed a configuration including, in order from an object side, lens units having positive, negative, positive, positive, negative, and positive refractive powers, that is, a configuration substantially having positive, negative, positive, negative, and positive refractive powers. In the configuration, the second lens unit, the third lens unit, and the fourth lens unit are configured to move during zooming.

In the case of a five-unit zoom lens having the refractive power arrangement described above, it is relatively easy to obtain high optical performance while downsizing the zoom lens and increasing a zoom ratio. However, the effective diameter of the first lens unit is increased when an angle of view is increased, and it is consequently difficult to achieve downsizing and downweighting of the zoom lens. Further, when the zoom ratio is increased while a focal length at a telephoto end is increased, various aberrations such as spherical aberration, astigmatism, and chromatic aberration are increased, and it is consequently difficult to maintain high optical performance.

In order to obtain a five-unit zoom lens which is downsized and increased in angle of view and zoom ratio, and has high optical performance over the entire zoom range, it is important to appropriately set, for example, the refractive power and lens structure of each lens unit, and the conditions of movement of each lens unit accompanying zooming. For example, it is important to appropriately set the focal length of a first lens unit and a relationship between the amount of movement of a second lens unit and the amount of movement of a third lens unit during zooming. If those elements are not appropriately set, it is quite difficult to obtain a zoom lens which is downsized, and has a wide angle, a high zoom ratio, and high optical performance over the entire zoom range.

In Japanese Patent Application Laid-Open No. 2013-015743, the amount of movement of the third lens unit is small, and hence the amount of movement of the second lens unit is increased in order to increase a zoom ratio. It is consequently difficult to increase an angle of view and the zoom ratio while maintaining the small effective diameter of the first lens unit. In Japanese Patent Application Laid-Open No. 2012-047814, the focal length of the first lens unit is short, and it is consequently difficult to satisfactorily correct spherical aberration and coma at zoom positions on a telephoto side, which deteriorate as a zoom ratio is increased.

SUMMARY OF THE INVENTION

It is an object of the present invention to provide a zoom lens which is downsized, and has a wide angle, a high zoom ratio, and high optical performance over the entire zoom range, and an image pickup apparatus including the zoom lens.

In order to achieve the above-mentioned object, according to one embodiment of the present invention, there is provided a zoom lens, including, in order from an object side to an image side: a first lens group, which is not moved for zooming and is composed of a single lens unit having a positive refractive power; a second lens group which has a negative refractive power and includes at least one lens unit each of which is moved toward an image side during zooming from a wide angle end to a telephoto end; a third lens group, which has a positive refractive power and includes at least one lens unit each of which is moved toward the object side during zooming from the wide angle end to the telephoto end; a fourth lens group, which is configured to move during zooming and focusing, and is composed of a single lens unit having a negative refractive power; and a rear lens group, which is composed of at least one lens unit, in which: intervals between adjacent lens units are changed during zooming; the first lens group includes at least three lenses; and the following conditional expressions are satisfied:

$$4.80 < f1/fw < 8.00;$$

$$-5.00 < M2/Mv < -1.50;$$

$$-3.50 < Mv/fw < -0.77; \text{ and}$$

$$0.99 < Nd1pr/Nd1pf < 1.40,$$

where f1 represents a focal length of the first lens group, fw represents a focal length of the zoom lens at the wide angle end, M2 represents an amount of movement of a lens unit which is moved by a largest amount during zooming from the wide angle end to the telephoto end among the at least one lens unit included in the second lens group, Mv represents an amount of movement of a lens unit which is moved by a largest amount from the wide angle end to the telephoto end among lens units which are moved toward an object side during zooming from the wide angle end to the telephoto end, Nd1pr represents a refractive index with respect to a d-line of a material of a positive lens G1pr arranged closest to the image side in the first lens group, Nd1pf represents an average of refractive indices with respect to the d-line of materials of positive lenses included in the first lens group other than the positive lens G1pr, and a sign of an amount of movement of a lens unit is defined as positive when the lens unit is located closer to the image side at the telephoto end than at the wide angle end.

According to the present invention, it is possible to provide the zoom lens which is downsized, and has a wide angle, a high zoom ratio, and high optical performance over the entire zoom range, and the image pickup apparatus including the zoom lens.

Further features of the present invention will become apparent from the following description of exemplary embodiments with reference to the attached drawings.

BRIEF DESCRIPTION OF THE DRAWINGS

FIG. 3 is a lens cross-sectional view in the state in which focus is at infinity at a wide angle end according to Embodiment 2 (Numerical Embodiment 2) of the present invention.

FIG. 4A is aberration diagrams in the state in which focus is at infinity at the wide angle end according to Numerical Embodiment 2.

FIG. 16B is aberration diagrams in the state in which focus is at infinity at an intermediate zoom position according to Numerical Embodiment 8.

FIG. 16C is aberration diagrams in the state in which focus is at infinity at a telephoto end according to Numerical Embodiment 8.

DESCRIPTION OF THE EMBODIMENTS

Hereinafter, embodiments of the present invention are described in detail based on the attached drawings.

A zoom lens of the present invention includes, in order from an object side to an image side: a first lens group, which is configured not to move for zooming (varying magnification), and is composed of a single lens unit having a positive refractive power; a second lens group, which has a negative refractive power, is configured to move toward the image side during varying magnification from a wide angle end to a telephoto end, and includes at least one lens unit; a third lens group, which has a positive refractive power, is configured to move toward the object side during varying magnification from the wide angle end to the telephoto end, and includes at least one lens unit; a fourth lens group, which is configured to move during varying magnification and focusing, and is composed of a single lens unit having a negative refractive power; and a rear lens group, which is composed of at least one lens unit.

The lens unit as used herein means one or more lenses configured to move along the same locus during varying magnification. That is, intervals between adjacent lens units are changed during varying magnification. The lens unit does not necessarily include a plurality of lenses, and the lens unit may include a single lens. Further, each of the first lens group, the second lens group, the third lens group, the fourth lens group, and the rear lens group includes one or more lens units. In the present invention, the first lens group and the fourth lens group are each composed of a single lens unit in all Embodiments, and hence are also referred to as a first lens unit and a fourth lens unit, respectively. Further, also the second lens group, the third lens group, and the rear lens group are referred to as a second lens unit, a third lens unit, and a rear lens unit, respectively, in Embodiments in which the lens group is composed of a single lens unit.

Figure 1:
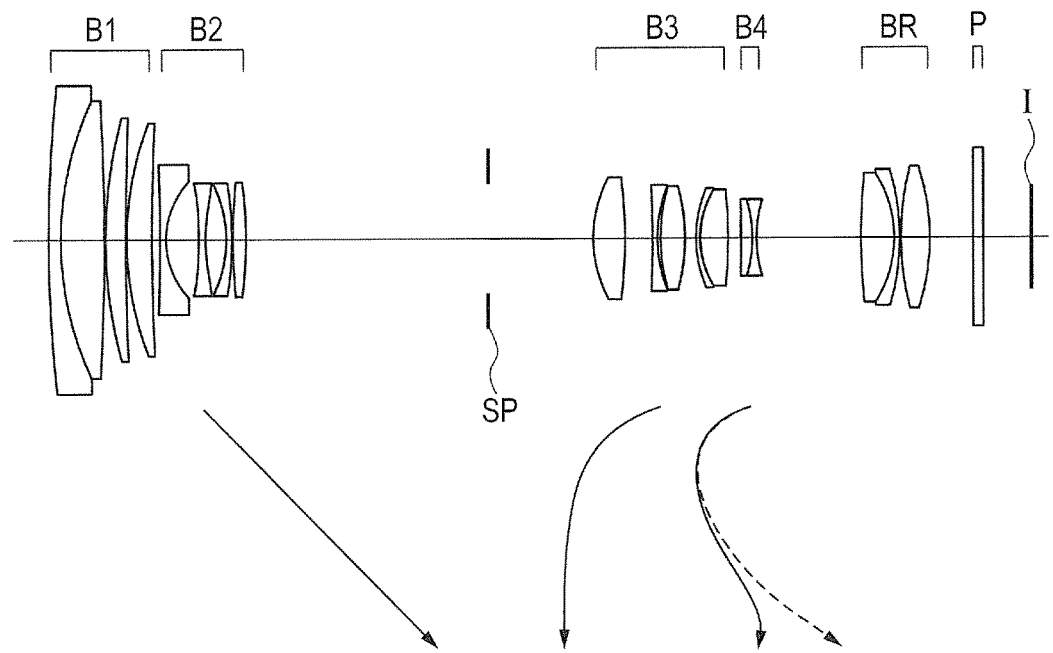
FIG. 1 is a lens cross-sectional view in a state in which focus is at infinity at a wide angle end according to Embodiment 1 (Numerical Embodiment 1) of the present invention.
Figure 2A:
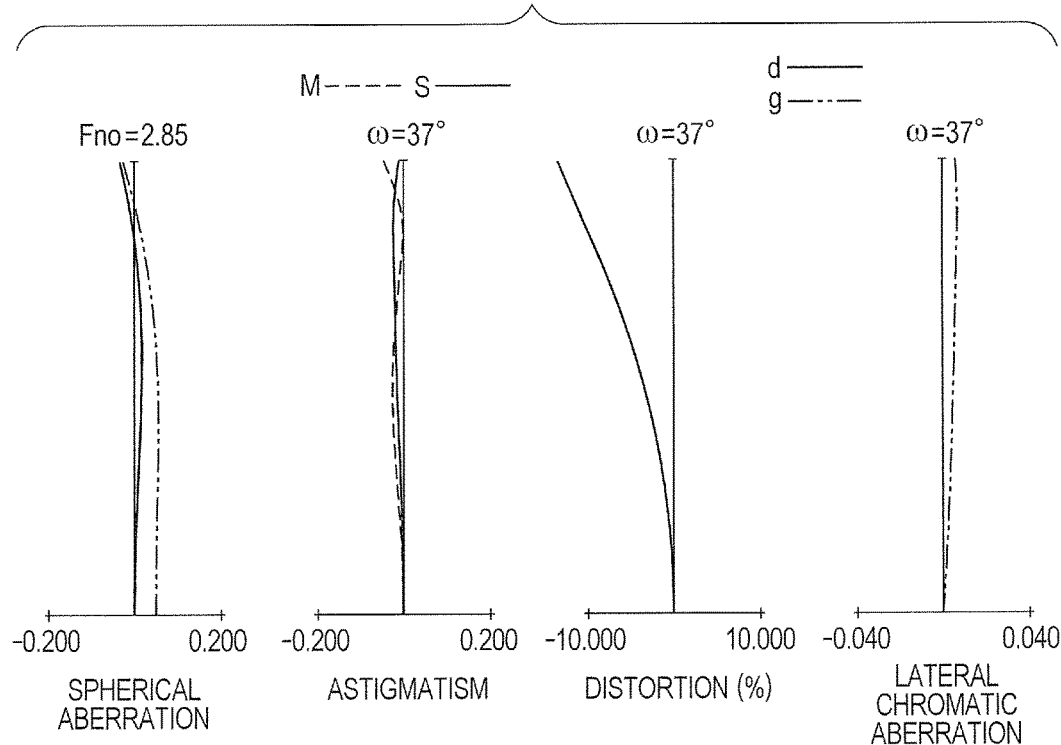
FIG. 2A is aberration diagrams in the state in which focus is at infinity at the wide angle end according to Numerical Embodiment 1.
Figure 2B:
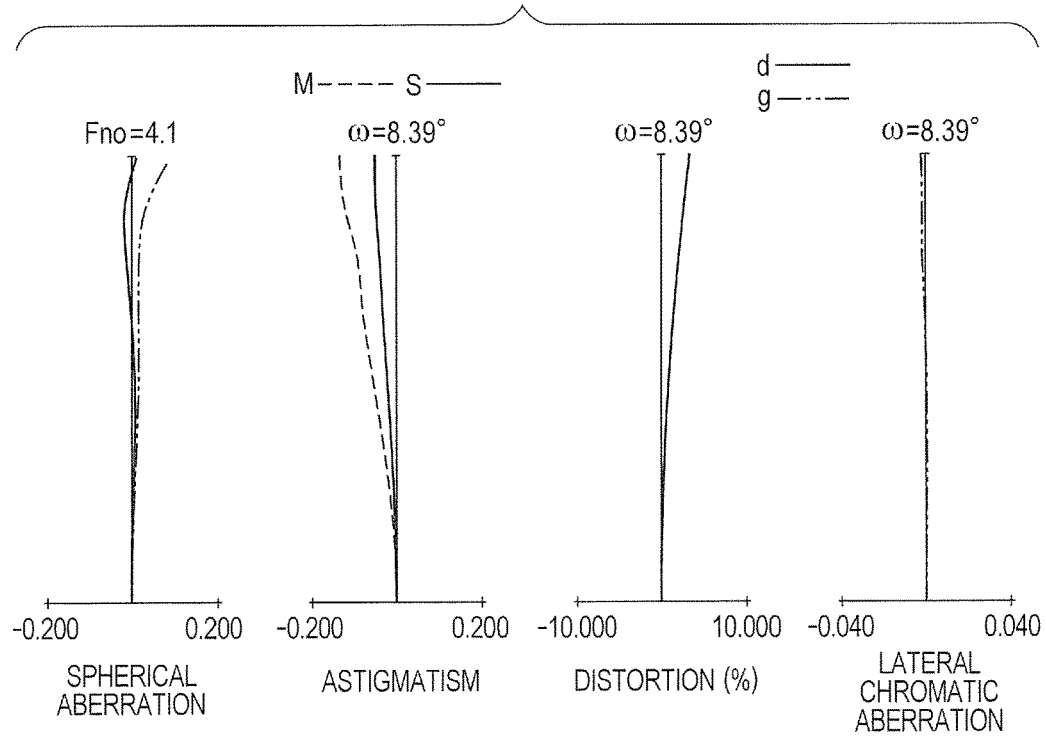
FIG. 2B is aberration diagrams in the state in which focus is at infinity at an intermediate zoom position according to Numerical Embodiment 1.
Figure 2C:
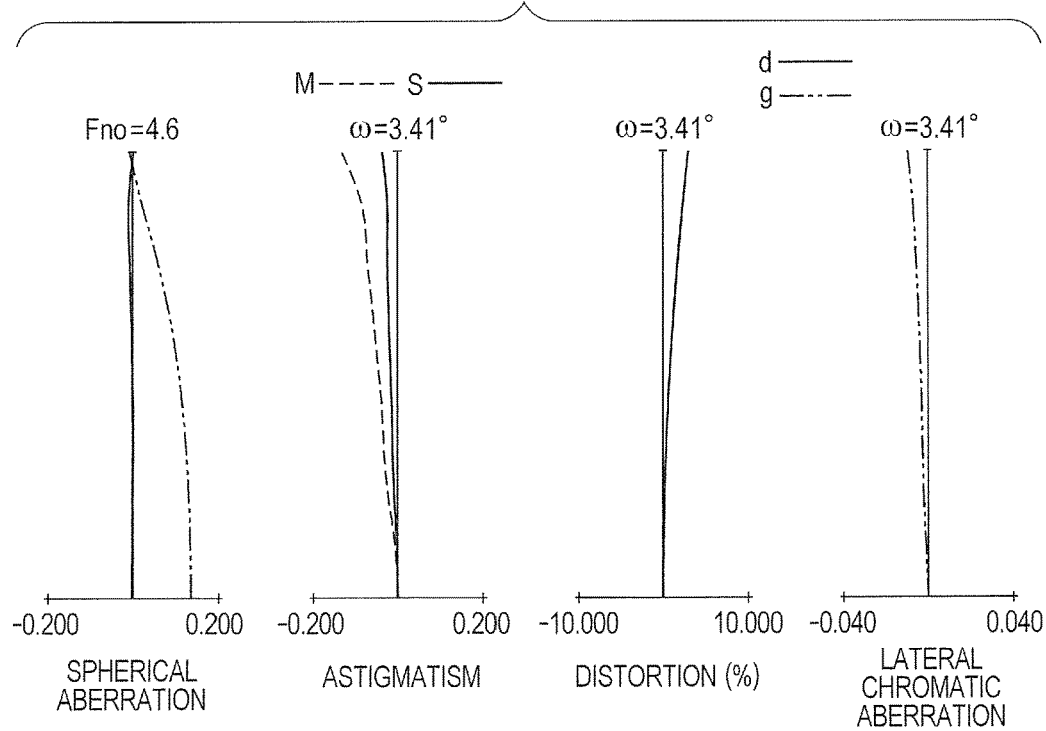
FIG. 2C is aberration diagrams in the state in which focus is at infinity at a telephoto end according to Numerical Embodiment 1.

FIG. 1 is a lens cross-sectional view in a state in which focus is on an object at infinity at a wide angle end according to Numerical Embodiment 1 corresponding to Embodiment 1 of the present invention. FIG. 2A, FIG. 2B, and FIG. 2C are longitudinal aberration diagrams in a state in which focus is on the object at infinity at the wide angle end, a focal length of 50.26 mm, and a telephoto end according to Numerical Embodiment 1, respectively.

A zoom lens according to each Embodiment is an image pickup optical system used in an image pickup apparatus. In each of the lens cross-sectional views, the left side corresponds to the object side and the right side corresponds to the image side. In each of the lens cross-sectional views, there are illustrated a first lens group B1 having a positive refractive power, a second lens group B2 having a negative refractive power, a third lens group B3 having a positive refractive power, a fourth lens group B4 having a positive refractive power, and a rear lens group BR.

An aperture stop SP is located between the second lens group B2 and the third lens group B3. The arrows indicate movement loci during zooming from the wide angle end to the telephoto end and a movement direction during focusing. The aperture stop SP in the zoom lens according to each Embodiment is configured not to move for zooming, but the aperture stop SP may be movable in an appropriate range. Further downsizing of the zoom lens is more easily achieved with the aperture stop SP that is movable during zooming, but in each Embodiment, the aperture stop SP is configured not to move for zooming so that the image pickup apparatus may have a simple structure. An optical filter P is an optical block corresponding to a face plate, for example. An image plane I corresponds to the image pickup surface of a solid-state image pickup element, for example, a CCD sensor or a CMOS sensor when the zoom lens is used as an image pickup optical system for, for example, a digital still camera or a video camera. The image plane I corresponds to a film surface when the zoom lens is used for a silver-halide film camera.

Of the aberration diagrams, in each of the spherical aberration diagrams, a d-line is denoted by d and a g-line is denoted by g. In each of the astigmatism diagrams, a meridional image plane and a sagittal image plane are denoted by $\Delta M$ and $\Delta S$, respectively. Lateral chromatic aberration is indicated by the g-line. Further, an F number is denoted by Fno. A half angle of view (degree) is denoted by $\omega$. In each Embodiment described later, the wide angle end and the telephoto end are zoom positions when a magnification varying lens unit is located at the ends of a range in which the magnification varying lens unit is mechanically movable in an optical axis direction.

In each Embodiment, during zooming from the wide angle end to the telephoto end, as indicated by the arrow, the second lens group B2 moves monotonously toward the image side. Further, the third lens group B3 moves to be located closer to the object side at the telephoto end than at the wide angle end. In this way, varying magnification is performed. Further, the fourth lens group B4 is configured to move along a locus convex on the object side or an S-shaped locus to correct an image plane variation accompanying varying magnification. Further, each Embodiment employs a rear focus type in which the fourth lens group B4 is configured to move on the optical axis to perform focusing. The solid curve and the broken curve related to the fourth lens group B4 are a movement locus for correcting an image plane variation accompanying zooming when focus is at infinity, and a movement locus for correcting an image plane variation when focus is at close distance, respectively. With the fourth lens group B4 configured to move along the locus convex on the object side, a space between the third lens group B3 and the fourth lens group B4 is effectively utilized, and hence the lens total length is reduced. Further, in each Embodiment, the fourth lens group B4 is configured to expand toward the image side to perform focusing from the infinity to close distance at the telephoto end. In each Embodiment, when an image is taken, the third lens group B3 may move in whole or in a part in a direction having a component in a direction vertical to the optical axis, thereby correcting a blur of the taken image that is generated when the zoom lens is vibrated. That is, image stabilization may be performed.

The zoom lens according to each Embodiment includes, in order from the object side to the image side, a first lens group, which is configured not to move for varying magnification, and is composed of a single lens unit having a positive refractive power, a second lens group, which has a negative refractive power, is configured to move toward the image side during varying magnification from the wide angle end to the telephoto end, and includes one or more lens units, a third lens group, which has a positive refractive power, is configured to move toward the object side during varying magnification from the wide angle end to the telephoto end, and includes one or more lens units, a fourth lens group, which is configured to move during varying magnification and focusing, and is composed of a single lens unit having a negative refractive power, and a rear lens group, which is composed of one or more lens units. Intervals between adjacent lens units are changed during varying magnification. The first lens group includes three or more lenses. The following conditional expressions are satisfied:

$$4.80 < f1/fw < 8.00 \quad (1);$$

$$-5.00 < M2/Mv < -1.50 \quad (2);$$

$$-3.50 < Mv/fw < -0.77 \quad (3); \text{ and}$$

$$0.99 < Nd1pr/Nd1pf < 1.40 \quad (4),$$

where f1 represents the focal length of the first lens group, fw represents the focal length of the zoom lens at the wide angle end, M2 represents the amount of movement of a lens unit configured to move by the largest amount during zooming from the wide angle end to the telephoto end among the lens units included in the second lens group, Mv represents the amount of movement of a lens unit having the largest amount of change in position between the wide angle end and the telephoto end among lens units configured to move in a direction opposite to a direction of movement of the second lens group during zooming from the wide angle end to the telephoto end (or Mv represents an amount of movement of a lens unit which is moved by a largest amount from the wide angle end to the telephoto end among lens units which are moved toward an object side during zooming from the wide angle end to the telephoto end), Nd1pr represents a refractive index with respect to the d-line of a material of a positive lens G1pr arranged closest to the image side in the first lens group, Nd1pf represents the average of refractive indices with respect to the d-line of materials of positive lenses included in the first lens group other than the positive lens G1pr, and a sign of the amount of movement of a lens unit when the lens unit is located closer to the image side at the telephoto end than at the wide angle end is positive.

Each of the differences in position M2 and Mv corresponds to the movement amount when the lens unit moves monotonously. When the lens units reciprocate, round trip distances are not included, and each of the differences in position M2 and Mv corresponds to a difference between a position at the wide angle end and a position at the telephoto end in the optical axis direction. Further, when the second lens group includes a plurality of lens units, M2 represents the amount of movement of a lens unit configured to move by the largest amount.

The zoom lens according to the present invention has the structure as described above, which is a structure suitable for obtaining a compact zoom lens having an increased zoom ratio. When the first lens group B1 has eccentricity, curvature of field is not rotationally symmetric at the telephoto end, and as a result, focus is made with different object distances between the left and right of a screen, for example, which is not preferred. The first lens group B1 is accordingly configured not to move for zooming. The second lens group B2 and the third lens group B3 are configured to move to perform varying magnification. The third lens group B3 is configured to move so that an entrance pupil position may be short at an intermediate zoom position and a front lens may have a small effective diameter. The fourth lens group B4 is configured to move to correct an image plane variation accompanying varying magnification.

Further, the first lens group B1 includes three or more lenses. In order to reduce the effective diameter of the first lens group B1, it is effective to use a lens material having a high refractive index for a positive lens closest to the image side among the positive lenses of the first lens group B1. However, a glass material having a high refractive index tends to have a large Abbe number. Thus, when a material having a high refractive index is used for the positive lens, it is particularly difficult to correct axial chromatic aberration at the telephoto end. A positive lens made of a material with small dispersion is accordingly added so that the effective diameter of the first lens group B1 can be reduced while axial chromatic aberration at the telephoto end is satisfactorily corrected. In addition, there is obtained an effect to reduce the curvature of each surface of the lenses of the first lens group B1. Consequently, coma and spherical aberration can be satisfactorily corrected at zoom positions on the telephoto side. The conditional expressions (1) to (4) described above are satisfied.

Next, the technical meanings of the conditional expressions (1) to (4) are described.

The conditional expression (1) defines the ratio of the focal length of the first lens group B1 to the focal length of the zoom lens at the wide angle end. When the ratio does not satisfy the condition of the upper limit of the conditional expression (1), the refractive power of the first lens group B1 is weak, and the amount of movement of the second lens group B2 that is necessary for obtaining a predetermined zoom ratio is large. As a result, it is difficult to reduce the total length and downsize the first lens group. In contrast, when the ratio does not satisfy the condition of the lower limit of the conditional expression (1), there is provided a structure advantageous in downsizing, but it is difficult to satisfactorily correct spherical aberration and coma at zoom positions on the telephoto side.

The conditional expression (2) defines a relationship between the amount of movement of the second lens group B2 during zooming from the wide angle end to the telephoto end, and the amount of movement of the lens unit configured to move by the largest amount among the lens units configured to move in the direction opposite to the direction of movement of the second lens group B2 during zooming from the wide angle end to the telephoto end. When the ratio does not satisfy the condition of the upper limit of the conditional expression (2), the amount of movement of the second lens group B2 is large, and a distance from the first lens group B1 to the aperture stop SP is long. As a result, the first lens group B1 is large, and it is difficult to achieve downsizing. In contrast, when the ratio does not satisfy the condition of the lower limit of the conditional expression (2), the lens groups other than the second lens group B2, which serves as a main magnification varying group, are required to move to achieve the zoom ratio, and the amounts of movement of the lens groups other than the second lens group B2 during zooming are large. As a result, the lens total length tends to be long, and it is difficult to achieve downsizing.

The conditional expression (3) defines the ratio of the amount of movement of the lens unit configured to move by the largest amount among the lens units configured to move in the direction opposite to the direction of movement of the second lens group B2 during zooming from the wide angle end to the telephoto end, to the focal length of the zoom lens at the wide angle end. When the ratio does not satisfy the condition of the upper limit of the conditional expression (3), the amount of movement of the third lens group B3 during zooming is too large, and the lens total length tends to be long, with the result that it is difficult to achieve downsizing. In contrast, when the ratio does not satisfy the condition of the lower limit of the conditional expression (3), the amount of movement of the third lens group B3 is small, and the amount of movement of the second lens group B2 that is necessary for obtaining a predetermined zoom ratio is large. As a result, it is difficult to reduce the total length and downsize the first lens group B1.

The conditional expression (4) defines a relationship between the refractive index of a material of the lens closest to the image side among the positive lenses of the first lens group B1, and the average value of the refractive indices of materials of the positive lenses other than the lens closest to the image side among the positive lenses of the first lens group B1.

In the first lens group B1, an angle formed by a ray passing through the lenses and the optical axis is the largest in the positive lens closest to the image side. Thus, when the positive lens closest to the image side in the first lens group B1 is thinned, a difference in effective diameter of a ray between a lens surface on the object side and a lens surface on the image side is reduced, and it is consequently easy to reduce the effective diameter of the front lens. However, when the refractive power of the positive lens closest to the image side in the first lens group B1 is weakened, a ray passes through the lenses that are closer to the object side than that positive lens is at a sharp angle with respect to the optical axis, leading to an increase in effective diameter of the front lens. Thus, in order to reduce the effective diameter of the front lens, it is effective to use a material having a high refractive index for the positive lens closest to the image side in the first lens group B1, thereby allowing the lens surfaces to have large curvature radii, and thin the lens while maintaining the refractive power at a certain level.

When the ratio does not satisfy the condition of the upper limit of the conditional expression (4), the effective diameters of the lenses of the first lens group B1 are easily reduced, and there is provided a structure advantageous in downsizing. However, the Petzval sum is large, and it is consequently difficult to correct curvature of field. In contrast, when the ratio does not satisfy the condition of the lower limit of the conditional expression (4), it is difficult to reduce the effective diameters of the lenses arranged on the object side of the first lens group, leading to a difficulty in downsizing.

It is more preferred to set the conditional expressions (1) to (4) as follows:

$$4.90<f1/fw<7.80 \quad (1a);$$

$$-4.60<M2/Mv<-1.60 \quad (2a);$$

$$-3.00<Mv/fw<-0.78 \quad (3a); \text{ and}$$

$$1.00<Nd1pr/Nd1pf<1.30 \quad (4a).$$

In another aspect of the zoom lens according to the present invention, the fourth lens group B4 is configured to move during focusing. In the zoom lens according to the present invention, a lens unit configured to move only for focusing is not provided, and the fourth lens group B4 also functions as a lens unit configured to correct the shift of the image plane during varying magnification so that the mechanism may be simplified. Further, it is preferred that a change in angle of view be small during focusing, and in the zoom lens according to the present invention, the lens unit arranged on the image side of the third lens group B3 having a small magnification varying action preferably performs focusing. In view of downweighting of the focus lens unit, it is desired that focusing be performed by the fourth lens group B4 because a lens group close to the third lens group B3 having a positive refractive power tends to have a small effective diameter.

In another aspect of the zoom lens according to the present invention, it is desired to satisfy the following conditional expression:

$$-7.00<f1/f2<-4.50 \quad (5),$$

where f2 represents a combined focal length of the lens units of the second lens group B2 at the wide angle end in which focus is at infinity.

The conditional expression (5) defines the ratio of the focal length of the first lens group B1 to the focal length of the second lens group B2 at the wide angle end. When the ratio does not satisfy the condition of the upper limit of the conditional expression (5), it is difficult to correct spherical aberration and coma at zoom positions on the telephoto side. In contrast, when the ratio does not satisfy the condition of the lower limit of the conditional expression (5), it is difficult to correct astigmatism at zoom positions on the wide angle side.

It is more preferred to set the conditional expression (5) as follows:

$$-6.50<f1/f2<-4.70 \quad (5a).$$

In another aspect of the zoom lens according to the present invention, it is desired to satisfy the following conditional expression:

$$1.50<f3/fw<3.50 \quad (6),$$

where f3 represents a combined focal length of the lens units of the third lens group B3 at the wide angle end in which focus is at infinity.

The conditional expression (6) defines the ratio of the focal length of the third lens group at the wide angle end to the focal length of the zoom lens at the wide angle end. When the ratio does not satisfy the condition of the upper limit of the conditional expression (6), the amount of movement of the third lens group B3 during zooming is large, and the lens total length is consequently long. In contrast, when the ratio does not satisfy the condition of the lower limit of the conditional expression (6), it is difficult to satisfactorily correct spherical aberration over the entire zoom range.

It is more preferred to set the conditional expression (6) as follows:

$$1.60<f3/fw<3.20 \quad (6a).$$

In another aspect of the zoom lens according to the present invention, it is desired to satisfy the following conditional expression:

$$-4.00<f4/fw<-1.00 \quad (7),$$

where f4 represents the focal length of the fourth lens group B4.

The conditional expression (7) defines the ratio of the focal length of the fourth lens group B4 to the focal length of the zoom lens at the wide angle end. When the ratio does not satisfy the condition of the upper limit of the conditional expression (7), an image plane position variation due to the movement of the fourth lens group B4 during zooming and focusing is too large, and it is consequently difficult to accurately correct the image plane. In contrast, when the ratio does not satisfy the condition of the lower limit of the conditional expression (7), the amount of movement of the fourth lens group B4 during zooming and focusing is large, and the lens total length is consequently long.

It is more preferred to set the conditional expressions (7) as follows:

$$-3.50<f4/fw<-1.30 \quad (7a).$$

In another aspect of the zoom lens according to the present invention, it is preferred that the aperture stop SP be arranged between the second lens group B2 and the third lens group B3. The aperture stop SP is arranged between the second lens group B2 and the third lens group B3, which are configured to move during zooming, and hence the second lens group B2 and the third lens group B3 move by appropriately provided amounts so that a distance from the first lens group B1 to the aperture stop SP may be controlled. In this way, the effective diameter of the first lens group B1 can be easily reduced. Further, it is preferred that the aperture stop SP be configured not to move in the optical axis direction for zooming. When the aperture stop SP is configured to move during zooming, it is necessary to move the aperture stop SP along with a mechanism for controlling an aperture diameter. As a result, a complex drive mechanism is required, which leads to an inevitable increase in power consumption for driving.

In another aspect of the zoom lens according to the present invention, it is preferred that the third lens group B3 include at least one negative lens. The third lens group B3 is a lens unit configured to move in the optical axis direction during zooming, and is a lens unit at which an axial ray have a ray height higher than those at other lens units at zoom positions on the wide angle side. Moreover, the third lens group B3 is a lens unit which strongly affects a difference in wavelength between axial chromatic aberration and spherical aberration. Because of this, in order to satisfactorily correct chromatic aberration over the entire zoom range, it is important that the negative lens be arranged so that chromatic aberration may be satisfactorily corrected in the third lens group B3.

In another aspect of the zoom lens according to the present invention, it is desired to satisfy the following conditional expression:

$$-4.50 < M2/f2 < -2.50 \tag{8}$$

The conditional expression (8) defines the ratio of the amount of movement M2 of the second lens group B2 during zooming from the wide angle end to the telephoto end, to the combined focal length f2 of the second lens group B2 at the wide angle end in which focus is at infinity. When the ratio does not satisfy the condition of the upper limit of the conditional expression (8), the amount of movement of the second lens group B2 during zooming is too large, and the first lens group B1 and the aperture stop SP are spaced apart from each other. As a result, it is difficult to reduce the effective diameter of the first lens group B1. In contrast, when the ratio does not satisfy the condition of the lower limit of the conditional expression (8), the amount of movement of the second lens group B2 is too small, and it is consequently difficult to increase the zoom ratio.

It is more preferred to set the conditional expression (8) as follows:

$$-4.20 < M2/f2 < -2.70 \tag{8a}$$

In another aspect of the zoom lens according to the present invention, it is desired to satisfy the following conditional expression:

$$-4.00 < (1-\beta 4w^2) \times \beta Rw^2 < -1.40 \tag{9}$$

The conditional expression (9) defines a relationship between the lateral magnification β4w of the fourth lens group at the wide angle end and the lateral magnification βRw of the rear lens group at the wide angle end. The fourth lens group is a lens unit configured to move during focusing, and the conditional expression (9) is proportional to an amount of change in image forming position due to the movement of the fourth lens group. When the conditional expression (9) falls within a predetermined range, an aberration variation due to focusing can be suppressed while the amount of movement of the fourth lens group during focusing is suppressed. When the value does not satisfy the condition of the upper limit of the conditional expression (9), the amount of movement of the fourth lens group during focusing is too large, and it is consequently difficult to reduce the total length. In contrast, when the value does not satisfy the condition of the lower limit of the conditional expression (9), variations in spherical aberration and curvature of field due to focusing cannot be suppressed.

It is more preferred to set the conditional expression (9) as follows:

$$-3.800 < (1-\beta 4w^2) \times \beta Rw^2 < -1.55 \tag{9a}$$

Now, a specific configuration of the zoom lens according to the present invention is described by way of features of lens configurations of Numerical Embodiments 1 to 9 corresponding to Embodiments 1 to 9, respectively.

Embodiment 1

The first lens group B1 in Embodiment 1 is described. The first lens group B1 corresponds to a first surface to a seventh surface. The first lens group B1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens group B2 corresponds to an eighth surface to a fifteenth surface, and includes a biconcave lens, a biconcave lens, a meniscus concave lens having a convex surface on the image side, and a biconvex lens. Further, the tenth surface and the eleventh surface have aspherical shapes, and mainly correct variations in curvature of field and coma at a peripheral image height accompanying varying magnification. The aperture stop SP corresponds to a sixteenth surface, and is arranged between the second lens group B2 and the third lens group B3. The third lens group B3 corresponds to a seventeenth surface to a twenty-fifth surface, and includes a biconvex lens, a biconcave lens, a biconvex lens, and a cemented lens obtained by cementing a meniscus concave lens having a convex surface on the object side and a biconvex lens. Further, the seventeenth surface and the eighteenth surface have aspherical shapes, and mainly correct a variation in spherical aberration accompanying varying magnification. Further, a cemented positive lens corresponding to the twenty-third surface to the twenty-fifth surface has a function to correct vibration due to, for example, shaking, which is exerted by the cemented positive lens moving in the direction having the component in the direction orthogonal to the optical axis. The fourth lens group B4 corresponds to a twenty-sixth surface to a twenty-eighth surface, and includes a cemented lens obtained by cementing a meniscus convex lens having a convex surface on the image side and a biconcave lens. Further, the fourth lens group B4 is a focus lens group configured to move toward the image side during focusing from an infinity side (solid line in FIG. 1) to a proximity side (broken line in FIG. 1). The rear lens group BR corresponds to a twenty-ninth surface to a thirty-third surface, and includes a cemented lens obtained by cementing a biconvex lens and a meniscus concave lens having a convex surface on the image side, and a biconvex lens.

Numerical Embodiment 1, which corresponds to Embodiment 1 described above, is described. In all Numerical Embodiments without limiting to Numerical Embodiment 1, the order of a surface (optical surface) from the object side is represented by i, a curvature radius of the i-th surface from the object side is represented by ri, and an interval between the i-th surface and the (i+1)-th surface from the object side (on the optical axis) is represented by di. Moreover, a refractive index and an Abbe number with respect to the d-line of a medium (optical member) between the i-th surface and the (i+1)-th surface are represented by ndi and vdi, respectively, and an air-equivalent back focus is represented by BF. The Abbe number ν is expressed by the following expression:

$$\nu = (nd-1)/(nF-nC),$$

where nd, nF, and nC represent refractive indices with respect to the d-line (587.6 nm), an F-line (486.1 nm), and a C-line (656.3 nm) of the Fraunhofer lines, respectively. When an X axis is set in the optical axis direction, an H axis is set in a direction perpendicular to the optical axis, a direction of travel of light is defined as positive, a paraxial curvature radius is represented by R, a conic constant is represented by k, and aspherical coefficients are represented by A4, A6, A8, A10, and A12, the aspherical shape is expressed by the expression below. Moreover, "e-Z" means "×10$^{-Z}$". The half angle of view is a value obtained by ray tracing.

$$X = \frac{H^2/R}{1+\sqrt{1-(1+k)(H/R)^2}} + A4H^4 + A6H^6 + A8H^8 + A10H^{10} + A12H^{12}$$

The values of Embodiment 1 corresponding to the respective conditional expressions are shown in Table 1. Embodiment 1 satisfies the expressions (1) to (9), and realizes the zoom lens which is downsized, and has a wide angle, a high zoom ratio, and high optical performance over the entire zoom range. It is essential that the zoom lens according to the present invention satisfy the expressions (1) to (4), but the zoom lens does not always need to satisfy the expressions (5) to (9). However, when at least one of the expressions (5) to (9) is satisfied, even better effects may be provided. This is also true for the other Embodiments.

Figure 19:
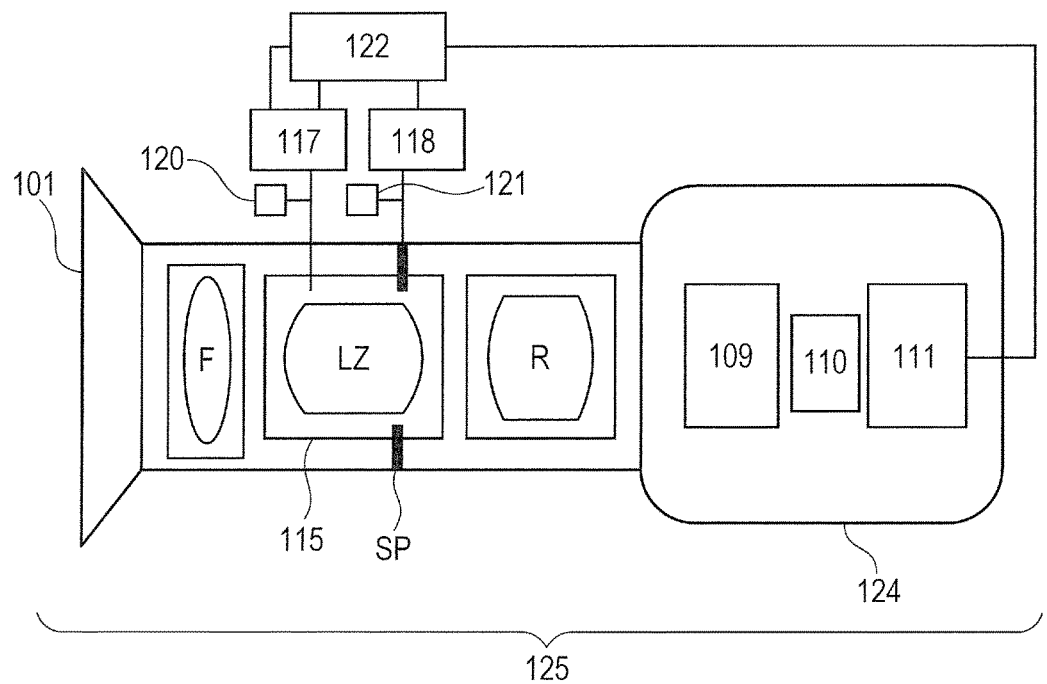
FIG. 19 is a schematic diagram for illustrating a main part of a video camera (image pickup apparatus) having mounted thereon a zoom lens according to the present invention.

FIG. 19 is a schematic diagram of an image pickup apparatus (television camera system) using the zoom lens according to each of Embodiments as an image pickup optical system. In FIG. 19, the zoom lens according to any one of Embodiments 1 to 9, which is denoted by 101, and a camera 124 are illustrated. The zoom lens 101 is configured to be detachably attachable to the camera 124. An image pickup apparatus 125 is formed by attaching the zoom lens 101 to the camera 124. The zoom lens 101 includes a first lens group F, a magnification varying portion LZ, and a rear lens group R. The magnification varying portion LZ includes a lens unit for focusing. The magnification varying portion LZ includes the second lens group and the third lens group configured to move on the optical axis for varying magnification, and the fourth lens group configured to move on the optical axis to correct an image plane variation accompanying varying magnification. The fourth lens group also serves as the focus lens group configured to move toward the image side during focusing from an infinity side to a proximity side. An aperture stop is denoted by SP. A drive mechanism 115, such as helicoids or cams, is configured to drive the magnification varying portion LZ in the optical axis direction. Motors (drive units) 117 and 118 are configured to electrically drive the drive mechanism 115 and the aperture stop SP, respectively. Detectors 120 and 121, such as encoders, potentiometers, or photosensors, are configured to detect the position of the magnification varying portion LZ on the optical axis, and an aperture diameter of the aperture stop SP, respectively. In the camera 124, a glass block 109 corresponds to an optical filter or a color separation optical system in the camera 124, and a solid-state image pickup element (photoelectric conversion element) 110, such as a charge-coupled device (CCD) sensor or a complementary metal oxide semiconductor (CMOS) sensor, is configured to receive light of an object image formed by the zoom lens 101. When an electronic image pickup element is used, the image quality of output images can be further increased through electronic correction of aberration. Moreover, central processing units (CPUs) 111 and 122 are configured to control various kinds of driving of the camera 124 and the zoom lens 101, respectively. As described above, the zoom lens according to the present invention is applied to a digital video camera, a television camera, or a cinema camera to realize an image pickup apparatus having high optical performance.

Embodiment 2

Figure 4B:
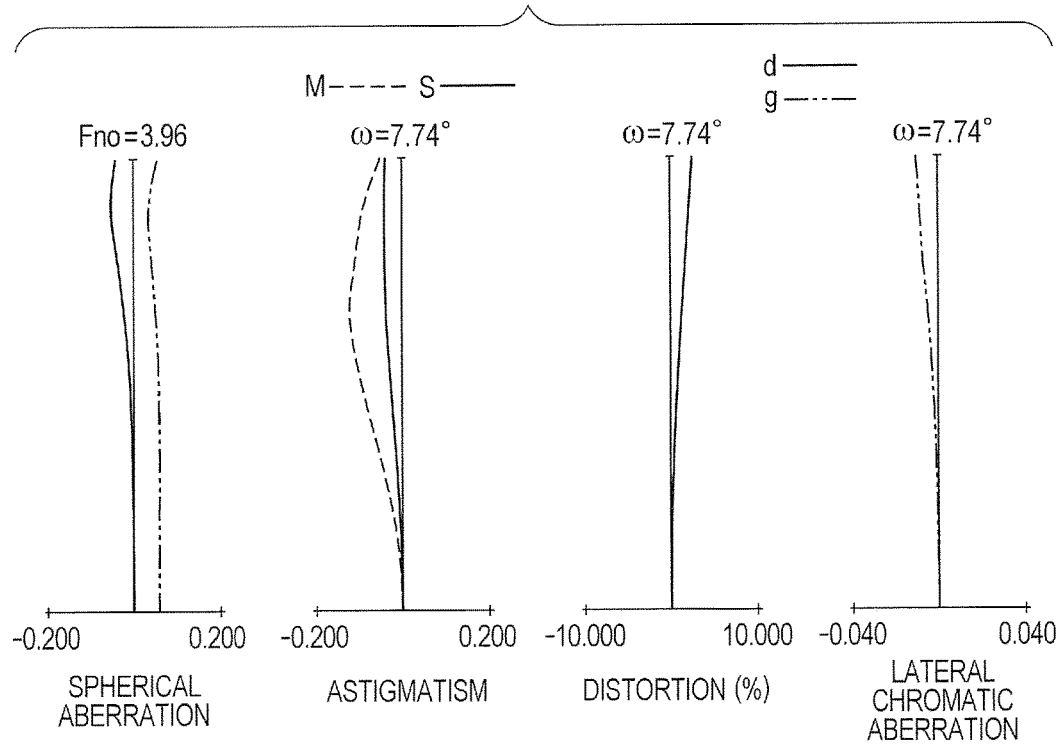
FIG. 4B is aberration diagrams in the state in which focus is at infinity at an intermediate zoom position according to Numerical Embodiment 2.
Figure 4C:
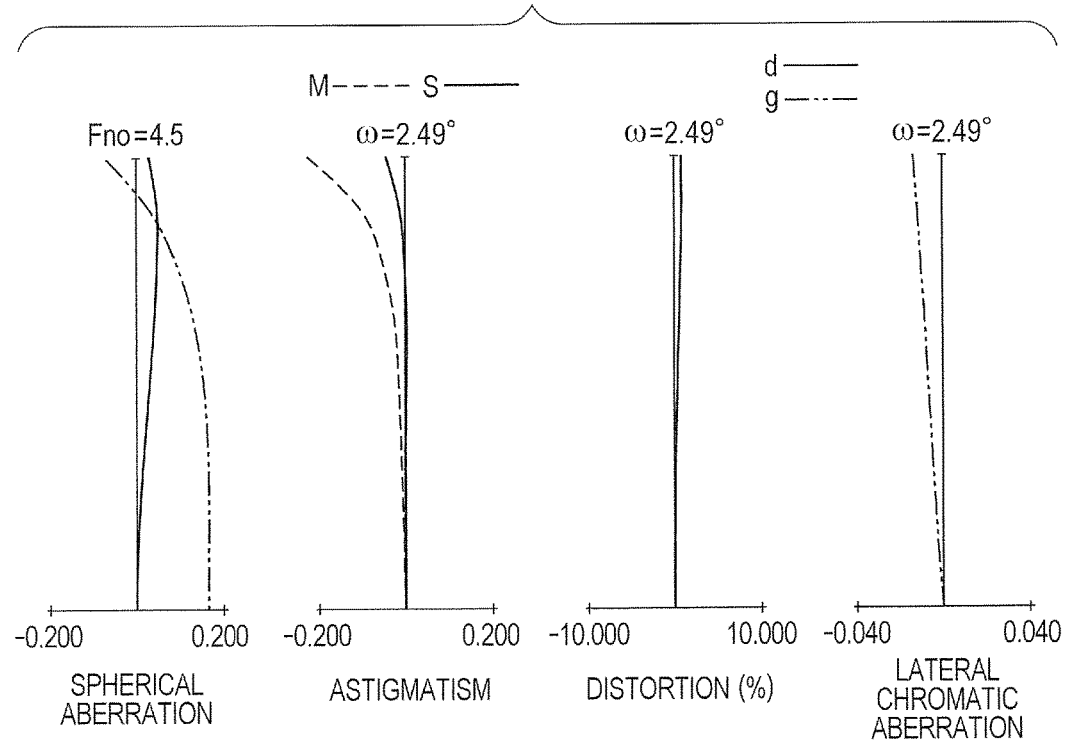
FIG. 4C is aberration diagrams in the state in which focus is at infinity at a telephoto end according to Numerical Embodiment 2.

FIG. 3 is a lens cross-sectional view when the focus is at the infinity at the wide angle end in the zoom lens according to Embodiment 2 (Numerical Embodiment 2) of the present invention. FIG. 4A, FIG. 4B, and FIG. 4C are longitudinal aberration diagrams at the wide angle end, a focal length of 54.45 mm, and the telephoto end, respectively. Each of the aberration diagrams is the longitudinal aberration diagram when the focus is at the infinity. In FIG. 3, the zoom lens includes, in order from the object side to the image side, a first lens group B1, which has a positive refractive power. The zoom lens further includes a second lens group B2 for varying magnification, which is configured to move toward the image side during varying magnification from the wide angle end to the telephoto end, and has a negative refractive power. The zoom lens further includes a third lens group B3 for varying magnification, which is configured to move on the optical axis nonlinearly during varying magnification from the wide angle end to the telephoto end, and has a positive refractive power. The zoom lens further includes a negative fourth lens group B4, which is configured to move on the optical axis nonlinearly in conjunction with the movement of the second lens group and the third lens group, to thereby correct an image plane variation accompanying varying magnification. In addition, the fourth lens group moves toward the image side during focusing from an infinity side (solid line in FIG. 3) to a proximity side (broken line in FIG. 3). The zoom lens further includes a rear lens group BR having a positive refractive power, which is configured not to move for varying magnification, and has an image forming action. During varying magnification, intervals between adjacent lens units of the first, second, third, fourth, and rear lens groups are changed. An aperture stop is denoted by SP, and an image plane is denoted by I.

Next, the first lens group B1 of Embodiment 2 is described. The first lens group B1 corresponds to a first surface to an eighth surface. The first lens group B1 includes a meniscus concave lens having a convex surface on the object side, a biconvex lens, a meniscus convex lens having a convex surface on the object side, and a meniscus convex lens having a convex surface on the object side. The second lens group B2 corresponds to a ninth surface to a fourteenth surface, and includes a meniscus concave lens having a convex surface on the object side, a biconcave lens, and a biconvex lens. Further, the tenth surface has an aspherical shape, and mainly corrects variations in curvature of field and coma at a peripheral image height accompanying varying magnification. The aperture stop SP corresponds to a fifteenth surface, and is arranged between the second lens group B2 and the third lens group B3. The third lens group B3 corresponds to a sixteenth surface to a twenty-fourth surface, and includes a biconvex lens, a meniscus concave lens having a convex surface on the object side, a biconvex lens, and a cemented lens obtained by cementing a biconvex lens and a meniscus concave lens having a convex surface on the image side. Further, the sixteenth surface and the seventeenth surface have aspherical shapes, and mainly correct a variation in spherical aberration accompanying varying magnification. Further, a cemented positive lens corresponding to the twenty-second surface to the twenty-fourth surface has a function to correct vibration due to, for example, shaking, which is exerted by the cemented positive lens moving in the direction having the component in the direction orthogonal to the optical axis. The fourth lens group B4 corresponds to a twenty-fifth surface to a twenty-seventh surface, and includes a cemented lens obtained by cementing a meniscus convex lens having a convex surface on the image side and a biconcave lens. Further, the fourth lens group B4 is a focus lens group configured to move toward the image side during focusing from the infinity side to the proximity side. The rear lens group BR corresponds to a twenty-eighth surface to a thirty-second surface, and includes a cemented lens obtained by cementing a meniscus concave lens having a convex surface on the object side and a meniscus convex lens having a convex surface on the object side, and a biconvex lens. The values of Embodiment 2 corresponding to the respective conditional expressions are shown in Table 1. Embodiment 2 satisfies the expressions (1) to (9), and realizes the zoom lens which is downsized, and has a wide angle, a high zoom ratio, and high optical performance over the entire zoom range.

Embodiment 3

Figure 5:
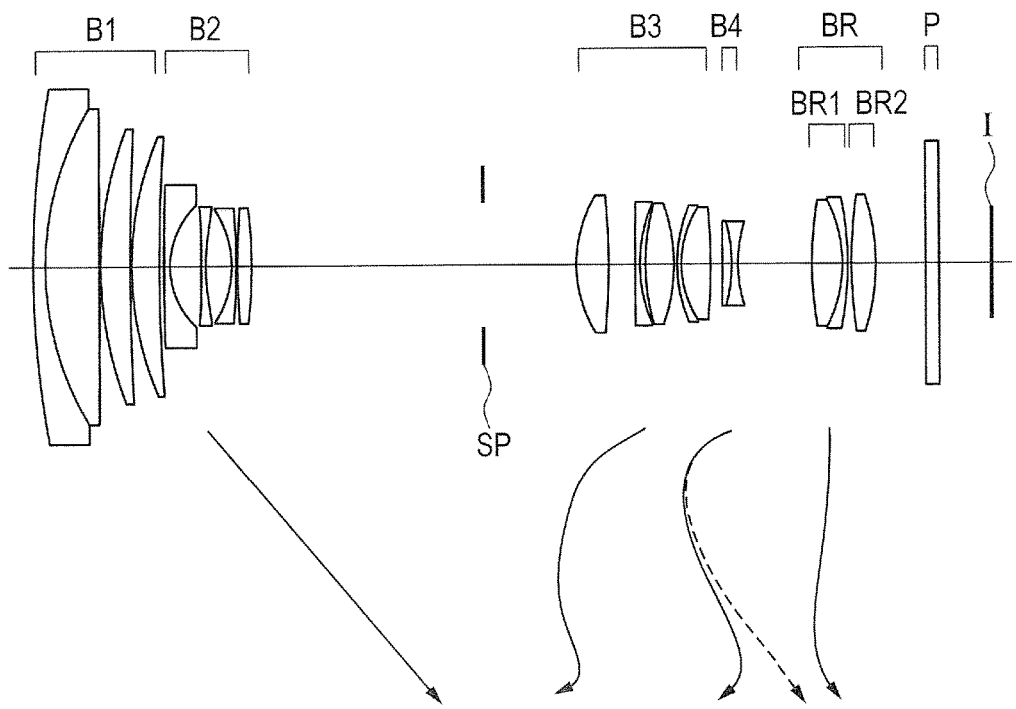
FIG. 5 is a lens cross-sectional view in the state in which focus is at infinity at a wide angle end according to Embodiment 3 (Numerical Embodiment 3) of the present invention.
Figure 6A:
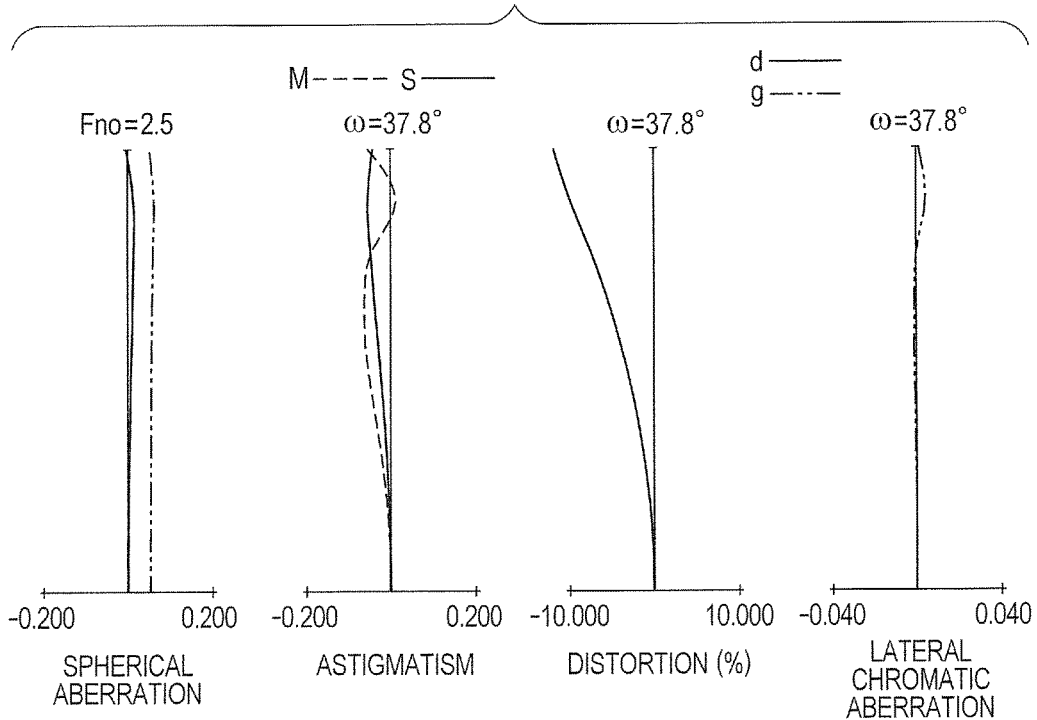
FIG. 6A is aberration diagrams in the state in which focus is at infinity at the wide angle end according to Numerical Embodiment 3.
Figure 6B:
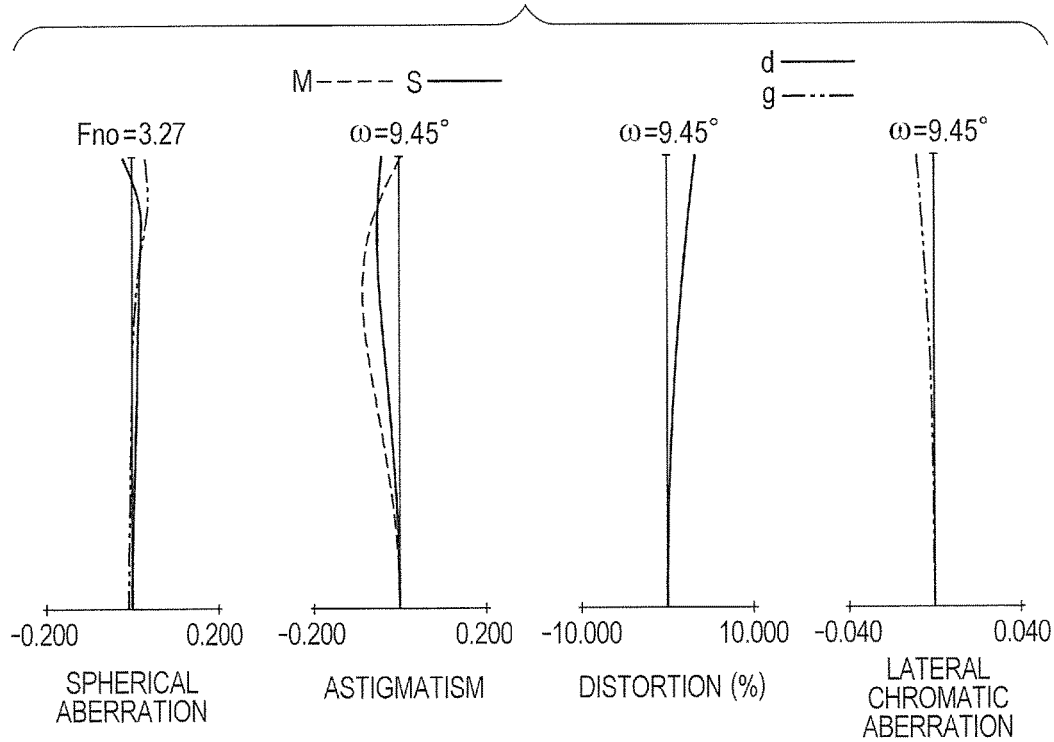
FIG. 6B is aberration diagrams in the state in which focus is at infinity at an intermediate zoom position according to Numerical Embodiment 3.
Figure 6C:
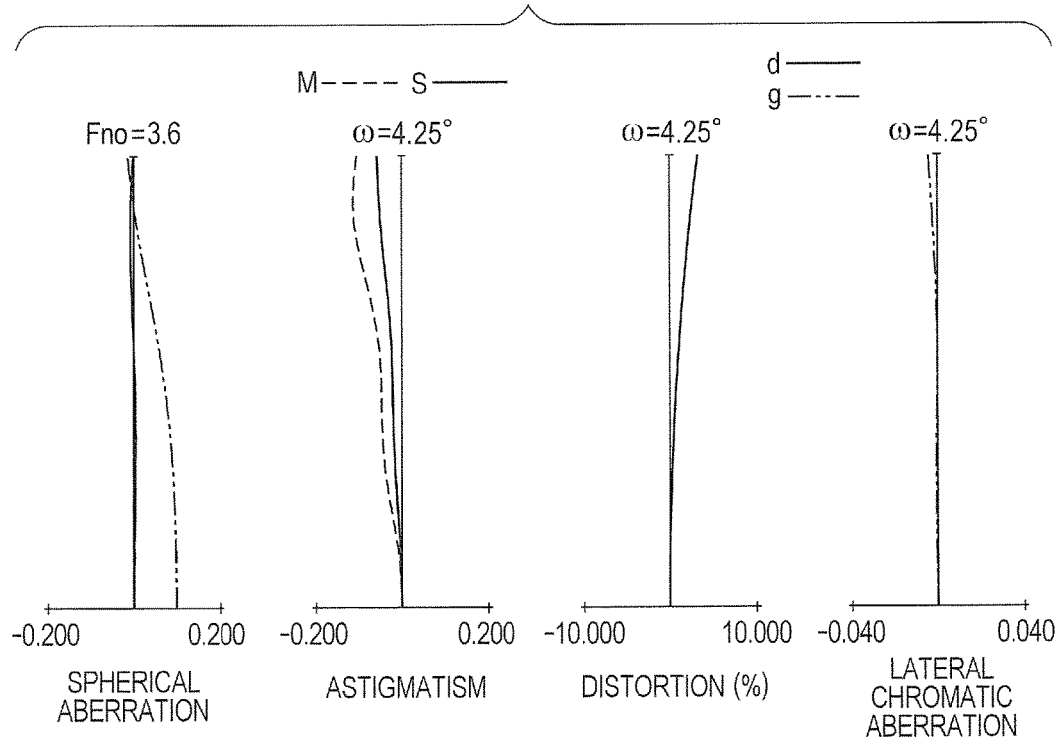
FIG. 6C is aberration diagrams in the state in which focus is at infinity at a telephoto end according to Numerical Embodiment 3.

FIG. 5 is a lens cross-sectional view when the focus is at the infinity at the wide angle end in the zoom lens according to Embodiment 3 (Numerical Embodiment 3) of the present invention. FIG. 6A, FIG. 6B, and FIG. 6C are longitudinal aberration diagrams at the wide angle end, a focal length of 44.51 mm, and the telephoto end, respectively. Each of the aberration diagrams is the longitudinal aberration diagram when the focus is at the infinity. In FIG. 5, the zoom lens includes, in order from the object side to the image side, a first lens group B1, which has a positive refractive power. The zoom lens further includes a second lens group B2 for varying magnification, which is configured to move toward the image side during varying magnification from the wide angle end to the telephoto end, and has a negative refractive power. The zoom lens further includes a third lens group B3 for varying magnification, which is configured to move on the optical axis nonlinearly during varying magnification from the wide angle end to the telephoto end, and has a positive refractive power. The zoom lens further includes a fourth lens group B4 having a negative refractive power, which is configured to move on the optical axis nonlinearly in conjunction with the movement of the second lens group and the third lens group, to thereby correct an image plane variation accompanying varying magnification. In addition, the fourth lens group moves toward the image side during focusing from an infinity side (solid line in FIG. 5) to a proximity side (broken line in FIG. 5). The zoom lens further includes a first rear lens group BR1 for varying magnification, which is configured to move on the optical axis nonlinearly during varying magnification from the wide angle end to the telephoto end, and has a positive refractive power. The zoom lens further includes a second rear lens group BR2, which is configured not to move for varying magnification, and has an image forming action. In Embodiment 3, the rear lens group BR includes the first rear lens group BR1 and the second rear lens group BR2. During varying magnification, intervals between adjacent lens units are changed. An aperture stop is denoted by SP, and an image plane is denoted by I.

Next, the first lens group B1 according to Embodiment 3 is described. The first lens group B1 corresponds to a first surface to a seventh surface. The first lens group B1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens group B2 corresponds to an eighth surface to a fifteenth surface, and includes a meniscus concave lens having a convex surface on the object side, a biconcave lens, a meniscus concave lens having a convex surface on the image side, and a biconvex lens. Further, the tenth surface and the eleventh surface have aspherical shapes, and mainly correct variations in curvature of field and coma at a peripheral image height accompanying varying magnification. The aperture stop SP corresponds to a sixteenth surface, and is arranged between the second lens group B2 and the third lens group B3. The third lens group B3 corresponds to a seventeenth surface to a twenty-fifth surface, and includes a biconvex lens, a meniscus concave lens having a convex surface on the object side, a biconvex lens, and a cemented lens obtained by cementing a meniscus concave lens having a convex surface on the object side and a biconvex lens. Further, the seventeenth surface and the eighteenth surface have aspherical shapes, and mainly correct a variation in spherical aberration accompanying varying magnification. Further, a cemented positive lens corresponding to the twenty-third surface to the twenty-fifth surface has a function to correct vibration due to, for example, shaking, which is exerted by the cemented positive lens moving in the direction having the component in the direction orthogonal to the optical axis. The fourth lens group B4 corresponds to a twenty-sixth surface to a twenty-eighth surface, and includes a cemented lens obtained by cementing a meniscus convex lens having a convex surface on the image side and a biconcave lens. Further, the fourth lens group B4 is a focus lens group configured to move toward the image side during focusing from the infinity side to the proximity side. The first rear lens group BR1 corresponds to a twenty-ninth surface to a thirty-first surface, and includes a cemented lens obtained by cementing a biconvex lens and a meniscus concave lens having a convex surface on the image side. The second rear lens group BR2 corresponds to a thirty-second surface to a thirty-third surface, and includes a biconvex lens. The values of Embodiment 3 corresponding to the respective conditional expressions are shown in Table 1. Embodiment 3 satisfies the expressions (1) to (9), and realizes the zoom lens which is downsized, and has a wide angle, a high zoom ratio, and high optical performance over the entire zoom range.

Embodiment 4

Figure 7:
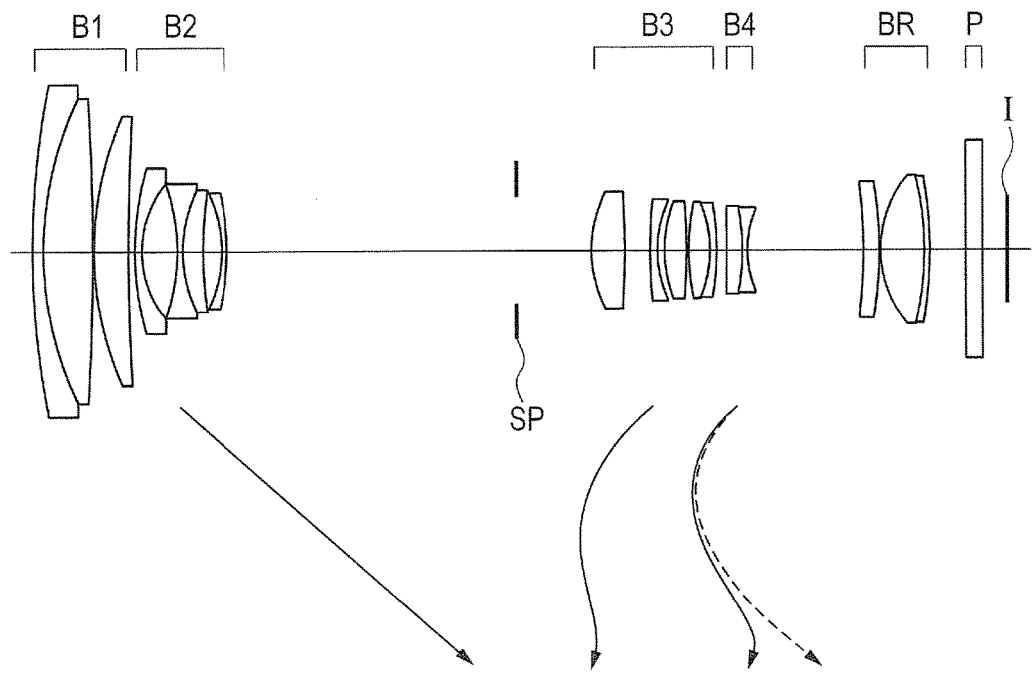
FIG. 7 is a lens cross-sectional view in the state in which focus is at infinity at a wide angle end according to Embodiment 4 (Numerical Embodiment 4) of the present invention.
Figure 8A:
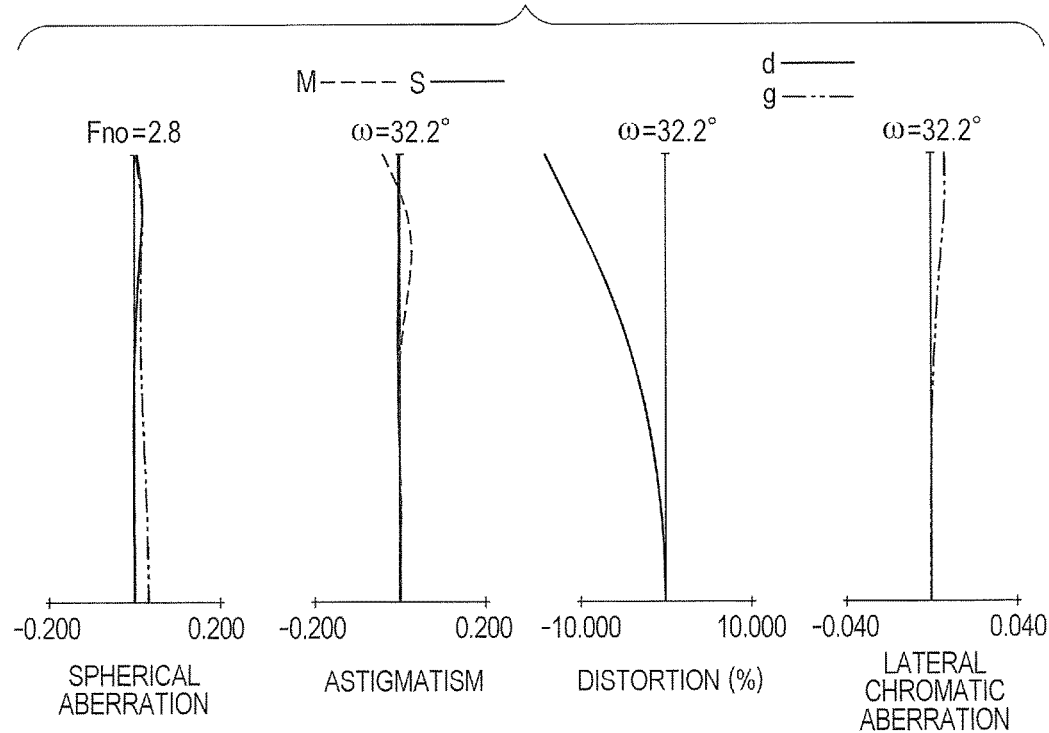
FIG. 8A is aberration diagrams in the state in which focus is at infinity at the wide angle end according to Numerical Embodiment 4.
Figure 8B:
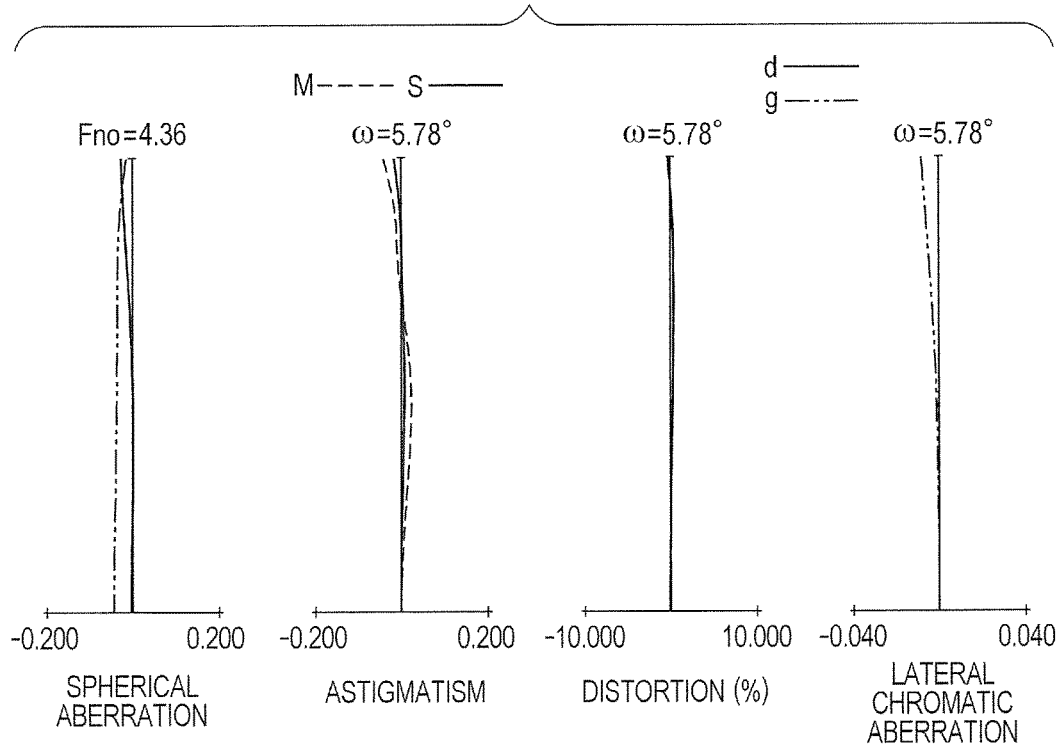
FIG. 8B is aberration diagrams in the state in which focus is at infinity at an intermediate zoom position according to Numerical Embodiment 4.
Figure 8C:
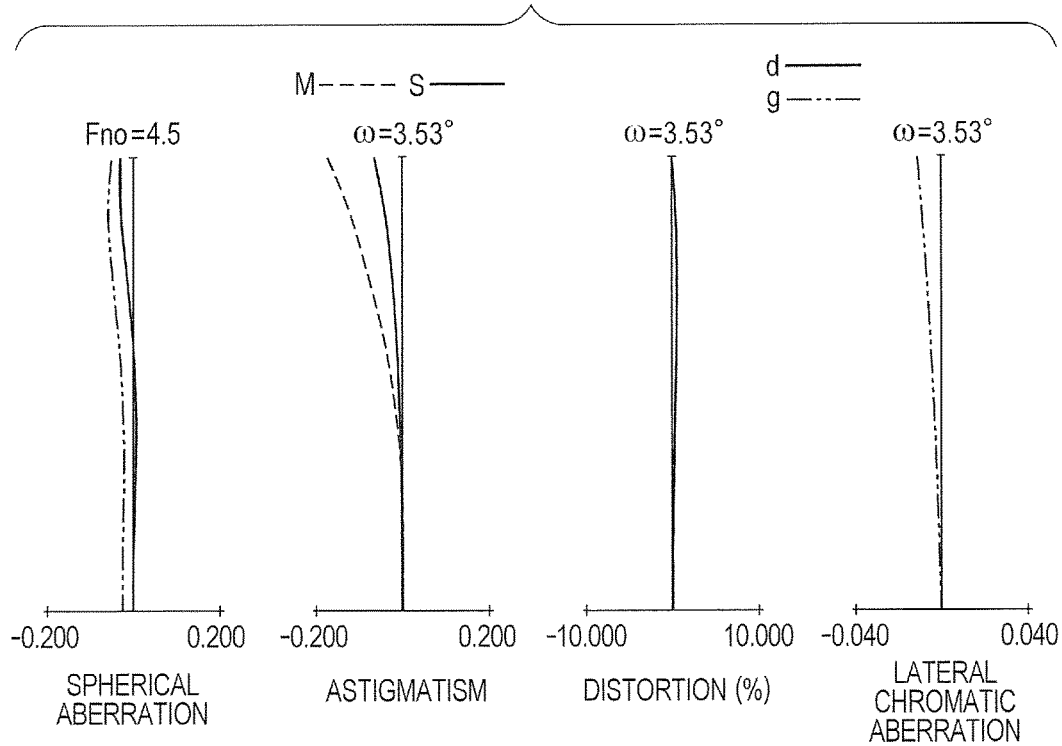
FIG. 8C is aberration diagrams in the state in which focus is at infinity at a telephoto end according to Numerical Embodiment 4.

FIG. 7 is a lens cross-sectional view when the focus is at the infinity at the wide angle end in the zoom lens according to Embodiment 4 (Numerical Embodiment 4) of the present invention. FIG. 8A, FIG. 8B, and FIG. 8C are longitudinal aberration diagrams at the wide angle end, a focal length of 73.07 mm, and the telephoto end, respectively. Each of the aberration diagrams is the longitudinal aberration diagram when the focus is at the infinity. In FIG. 7, the zoom lens includes, in order from the object side to the image side, a first lens group B1, which has a positive refractive power. The zoom lens further includes a second lens group B2 for varying magnification, which is configured to move toward the image side during varying magnification from the wide angle end to the telephoto end, and has a negative refractive power. The zoom lens further includes a third lens group B3 for varying magnification, which is configured to move on the optical axis nonlinearly during varying magnification from the wide angle end to the telephoto end, and has a positive refractive power. The zoom lens further includes a fourth lens group B4 having a negative refractive power, which is configured to move on the optical axis nonlinearly in conjunction with the movement of the second lens group and the third lens group, to thereby correct an image plane variation accompanying varying magnification. In addition, the fourth lens group moves toward the image side during focusing from an infinity side to a proximity side. The zoom lens further includes a rear lens group BR having a positive refractive power, which is configured not to move for varying magnification, and has an image forming action. During varying magnification, intervals between adjacent lens units are changed. An aperture stop is denoted by SP, and an image plane is denoted by I.

Next, the first lens group B1 according to Embodiment 4 is described. The first lens group B1 corresponds to a first surface to a fifth surface. The first lens group B1 includes a cemented lens obtained by cementing a meniscus concave lens having a convex surface on the object side and a biconvex lens, and a meniscus convex lens having a convex surface on the object side. The second lens group B2 corresponds to a sixth surface to a twelfth surface, and includes a meniscus concave lens having a convex surface on the object side, a cemented lens obtained by cementing a biconcave lens and a meniscus convex lens having a convex surface on the object side, and a meniscus concave lens having a convex surface on the image side. Further, the seventh surface has an aspherical shape, and mainly corrects curvature of field on the wide angle side. The aperture stop SP corresponds to a thirteenth surface, and is arranged between the second lens group B2 and the third lens group B3. The third lens group B3 corresponds to a fourteenth surface to a twenty-second surface, and includes a biconvex lens, a meniscus concave lens having a convex surface on the object side, a biconvex lens, and a cemented lens obtained by cementing a biconvex lens and a meniscus concave lens having a convex surface on the image side. Further, the fourteenth surface and the eighteenth surface have aspherical shapes, and mainly correct a variation in spherical aberration accompanying varying magnification. Further, a cemented positive lens corresponding to the twentieth surface to the twenty-second surface has a function to correct vibration due to, for example, shaking, which is exerted by the cemented positive lens moving in the direction having the component in the direction orthogonal to the optical axis. The fourth lens group B4 corresponds to a twenty-third surface to a twenty-fifth surface, and includes a cemented lens obtained by cementing a meniscus convex lens having a convex surface on the image side and a biconcave lens. Further, the twenty-third surface has an aspherical shape, and mainly corrects a variation in spherical aberration accompanying focusing. Further, the fourth lens group B4 is a focus lens group configured to move toward the image side during focusing from an infinity side (solid line in FIG. 7) to a proximity side (broken line in FIG. 7). The rear lens group BR corresponds to a twenty-sixth surface to a thirtieth surface, and includes a meniscus convex lens having a convex surface on the image side, and a cemented lens obtained by cementing a biconvex lens and a meniscus concave lens having a convex surface on the image side. Further, the twenty-seventh surface has an aspherical shape, and mainly corrects curvature of field and coma at a peripheral image height. The values of Embodiment 4 corresponding to the respective conditional expressions are shown in Table 1. Embodiment 4 satisfies the expressions (1) to (9), and realizes the zoom lens which is downsized, and has a wide angle, a high zoom ratio, and high optical performance over the entire zoom range.

Embodiment 5

Figure 9:
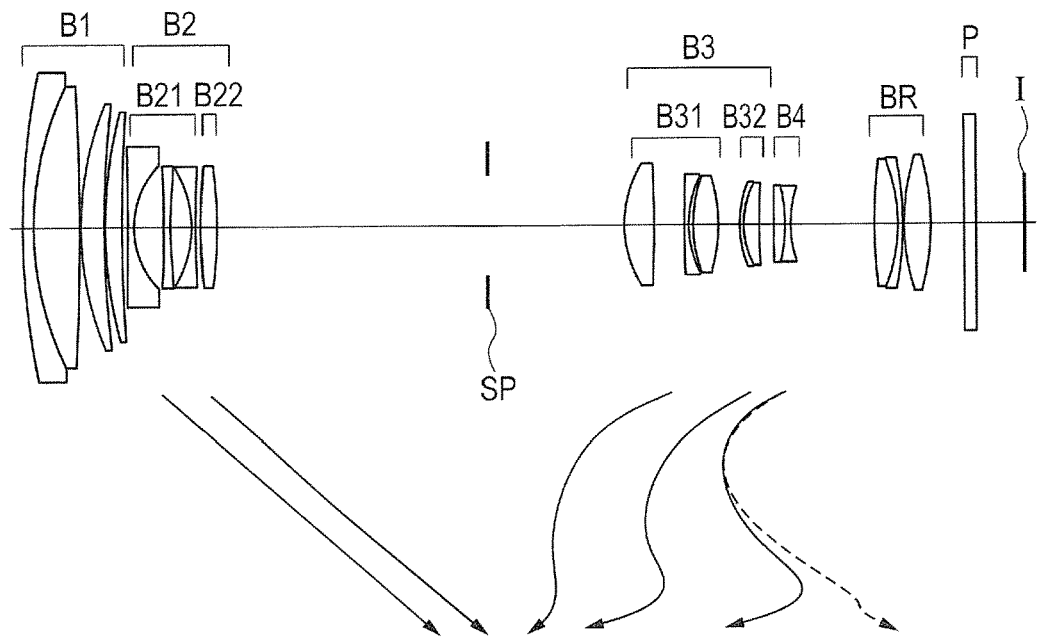
FIG. 9 is a lens cross-sectional view in the state in which focus is at infinity at a wide angle end according to Embodiment 5 (Numerical Embodiment 5) of the present invention.
Figure 10A:
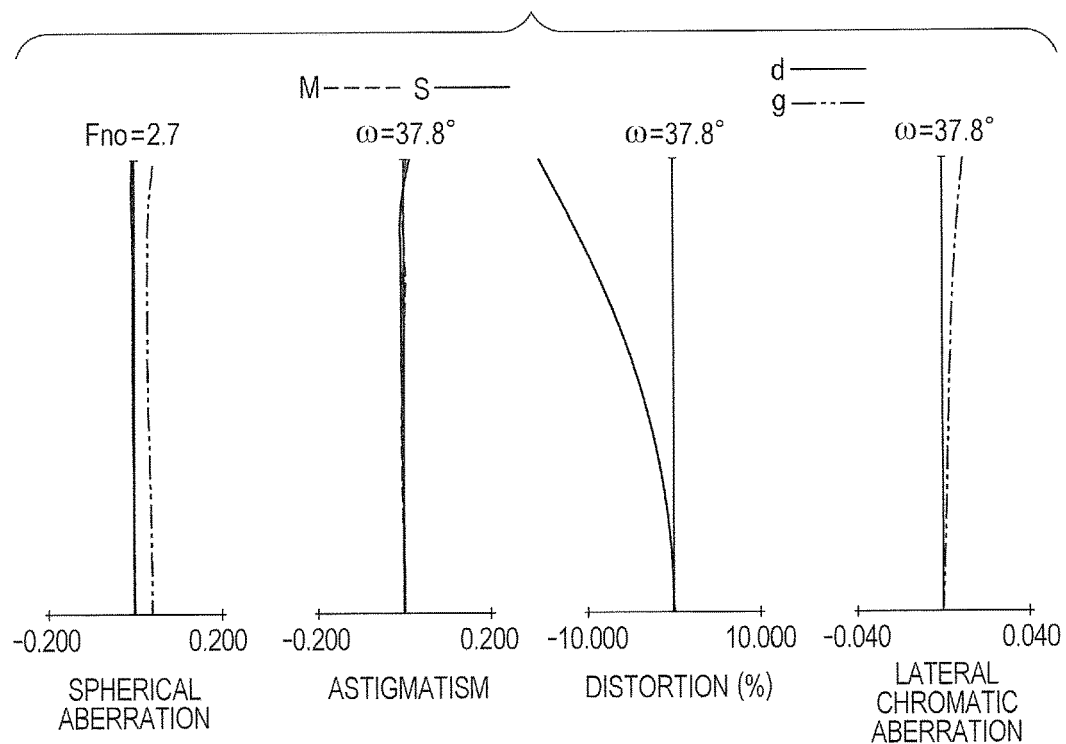
FIG. 10A is aberration diagrams in the state in which focus is at infinity at the wide angle end according to Numerical Embodiment 5.
Figure 10B:
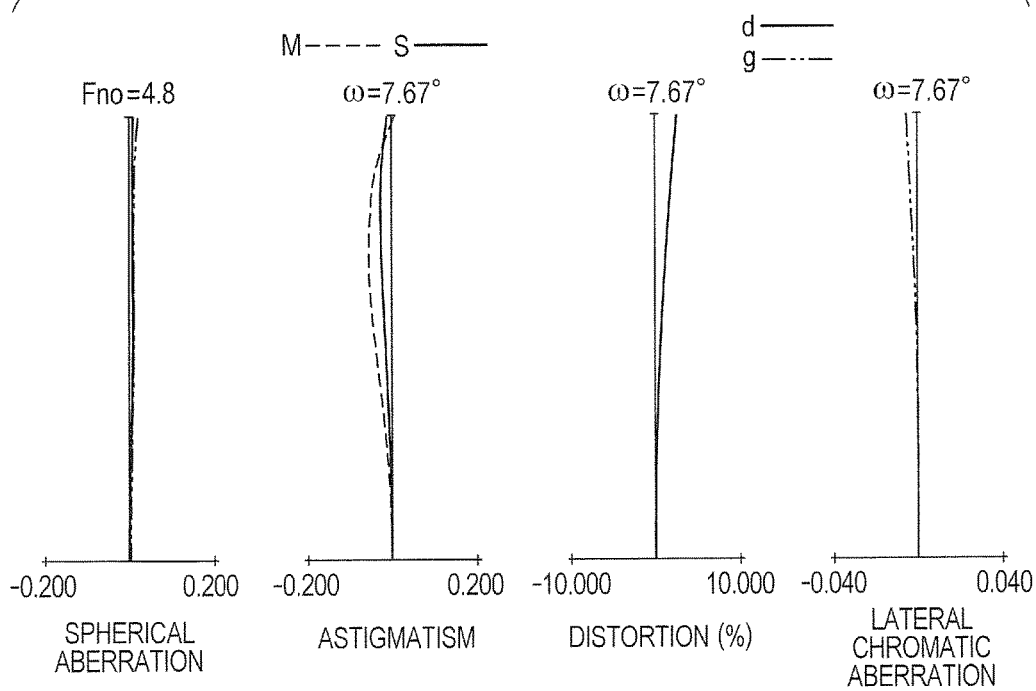
FIG. 10B is aberration diagrams in the state in which focus is at infinity at an intermediate zoom position according to Numerical Embodiment 5.
Figure 10C:
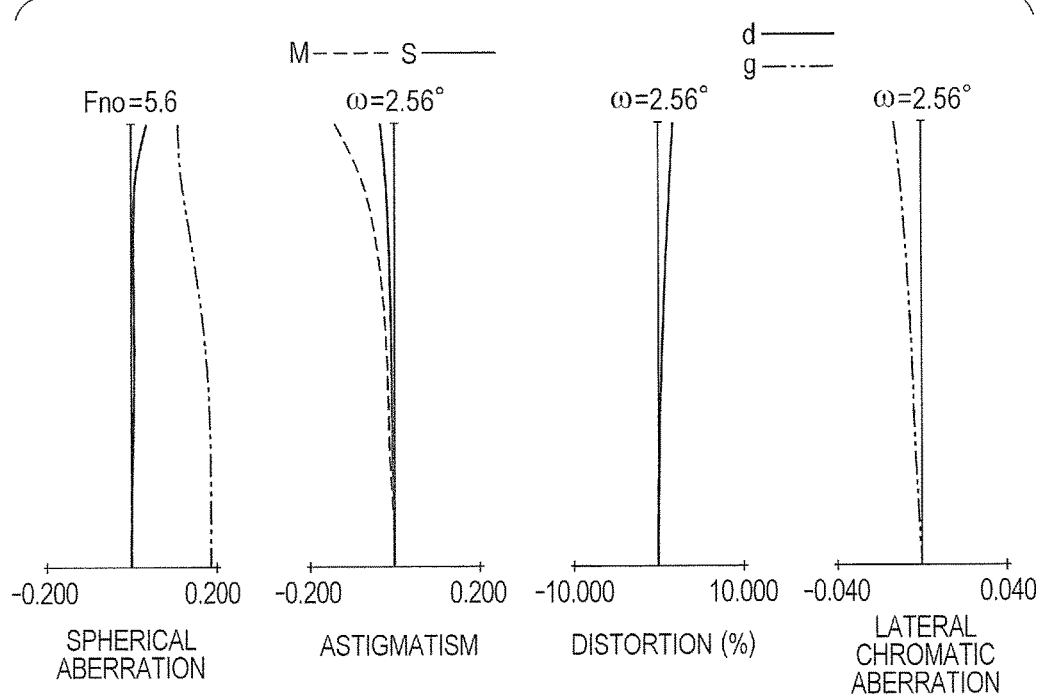
FIG. 10C is aberration diagrams in the state in which focus is at infinity at a telephoto end according to Numerical Embodiment 5.

FIG. 9 is a lens cross-sectional view when the focus is at the infinity at the wide angle end in the zoom lens according to Embodiment 5 (Numerical Embodiment 5) of the present invention. FIG. 10A, FIG. 10B, and FIG. 10C are longitudinal aberration diagrams at the wide angle end, a focal length of 55.00 mm, and the telephoto end, respectively. Each of the aberration diagrams is the longitudinal aberration diagram when the focus is at the infinity. In FIG. 9, the zoom lens includes, in order from the object side to the image side, a first lens group B1, which has a positive refractive power. The zoom lens further includes a second lens group B2 for varying magnification, which is configured to move toward the image side during varying magnification from the wide angle end to the telephoto end, and has a negative refractive power. The second lens group B2 includes two lens units, that is, a first lens subunit B21 and a second lens subunit B22 which are configured to move by different amounts. The zoom lens further includes a third lens group B3 for varying magnification, which is configured to move on the optical axis nonlinearly during varying magnification from the wide angle end to the telephoto end, and has a positive refractive power. The third lens group B3 includes two lens units, that is, a first lens subunit B31 and a second lens subunit B32 which are configured to move by different amounts. The zoom lens further includes a fourth lens group B4 having a negative refractive power, which is configured to move on the optical axis nonlinearly in conjunction with the movement of the second lens group and the third lens group, to thereby correct an image plane variation accompanying varying magnification. In addition, the fourth lens group moves toward the image side during focusing from an infinity side (solid line in FIG. 9) to a proximity side (broken line in FIG. 9). The zoom lens further includes a rear lens group BR having a positive refractive power, which is configured not to move for varying magnification, and has an image forming action. During varying magnification, intervals between adjacent lens units are changed. An aperture stop is denoted by SP, and an image plane is denoted by I.

Next, the first lens group B1 of Embodiment 5 is described. The first lens group B1 corresponds to a first surface to a seventh surface. The first lens group B1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens group B2 corresponds to an eighth surface to a fifteenth surface, and includes the two lens units, that is, the first lens subunit B21 corresponding to the eighth surface to the thirteenth surface, and the second lens subunit B22 corresponding to the fourteenth surface and the fifteenth surface. The first lens subunit B21 includes a biconcave lens, a meniscus concave lens having a convex surface on the object side, and a biconcave lens. Further, the tenth surface and the eleventh surface have aspherical shapes, and mainly correct curvature of field on the wide angle side. The second lens subunit B22 includes a biconvex lens. An interval between the first lens subunit B21 and the second lens subunit B22 is changed at an intermediate zoom position so that a variation in curvature of field during zooming may be corrected. The aperture stop SP corresponds to a sixteenth surface, and is arranged between the second lens group B2 and the third lens group B3. The third lens group B3 corresponds to a seventeenth surface to a twenty-fifth surface, and includes the two lens units, that is, the first lens subunit B31 corresponding to the seventeenth surface to the twenty-second surface, and the second lens subunit B32 corresponding to the twenty-third surface to the twenty-fifth surface. The first lens subunit B31 includes a biconvex lens, a meniscus concave lens having a convex surface on the object side, and a biconvex lens. The second lens subunit B32 includes a cemented lens obtained by cementing a meniscus concave lens having a convex surface on the object side and a meniscus convex lens having a convex surface on the object side. An interval between the first lens subunit B31 and the second lens subunit B32 is changed at the intermediate zoom position so that variations in spherical aberration and coma during zooming may be corrected. The seventeenth surface and the eighteenth surface have aspherical shapes, and mainly correct a variation in spherical aberration accompanying varying magnification. The fourth lens group B4 corresponds to a twenty-sixth surface to a twenty-eighth surface, and includes a cemented lens obtained by cementing a biconvex lens and a biconcave lens. The rear lens group BR corresponds to a twenty-ninth surface to a thirty-third surface, and includes a cemented lens obtained by cementing a biconvex lens and a meniscus concave lens having a convex surface on the image side, and a biconvex lens. The values of Embodiment 5 corresponding to the respective conditional expressions are shown in Table 1. Embodiment 5 satisfies the expressions (1) to (9), and realizes the zoom lens which is downsized, and has a wide angle, a high zoom ratio, and high optical performance over the entire zoom range.

Embodiment 6

Figure 11:
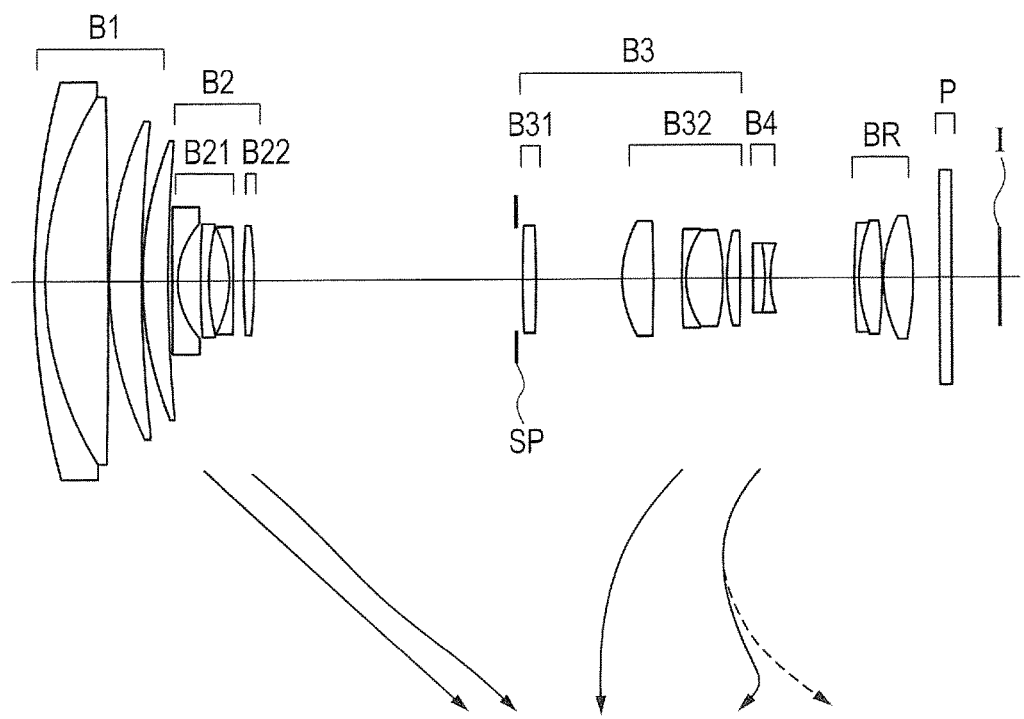
FIG. 11 is a lens cross-sectional view in the state in which focus is at infinity at a wide angle end according to Embodiment 6 (Numerical Embodiment 6) of the present invention.
Figure 12A:
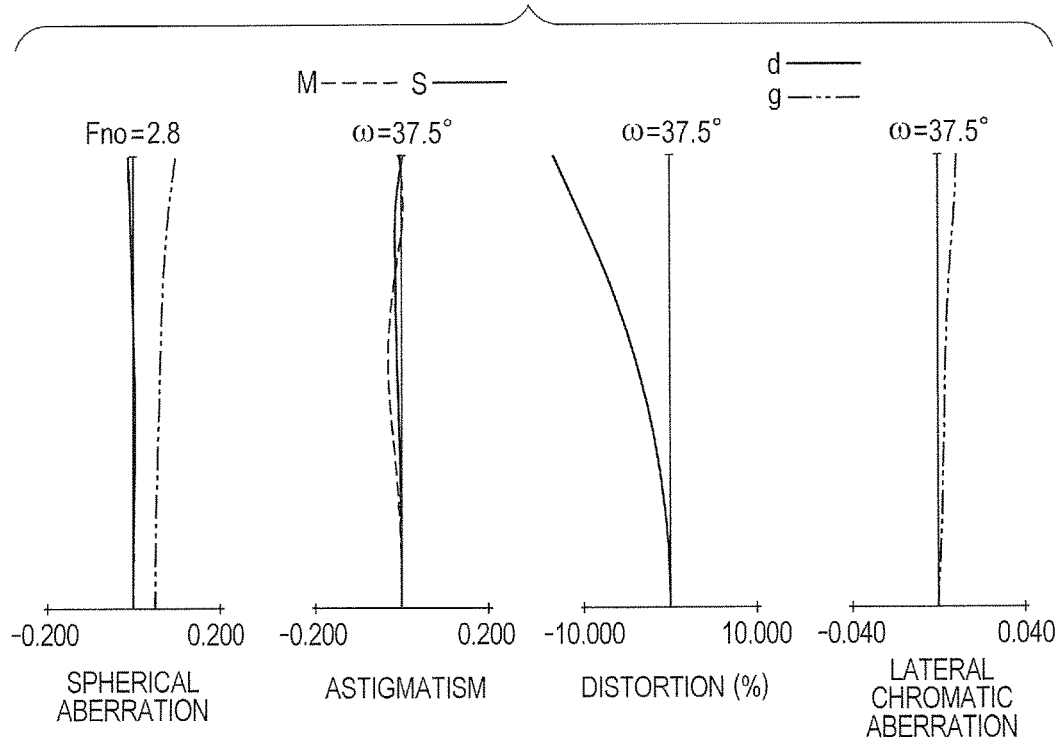
FIG. 12A is aberration diagrams in the state in which focus is at infinity at the wide angle end according to Numerical Embodiment 6.
Figure 12B:
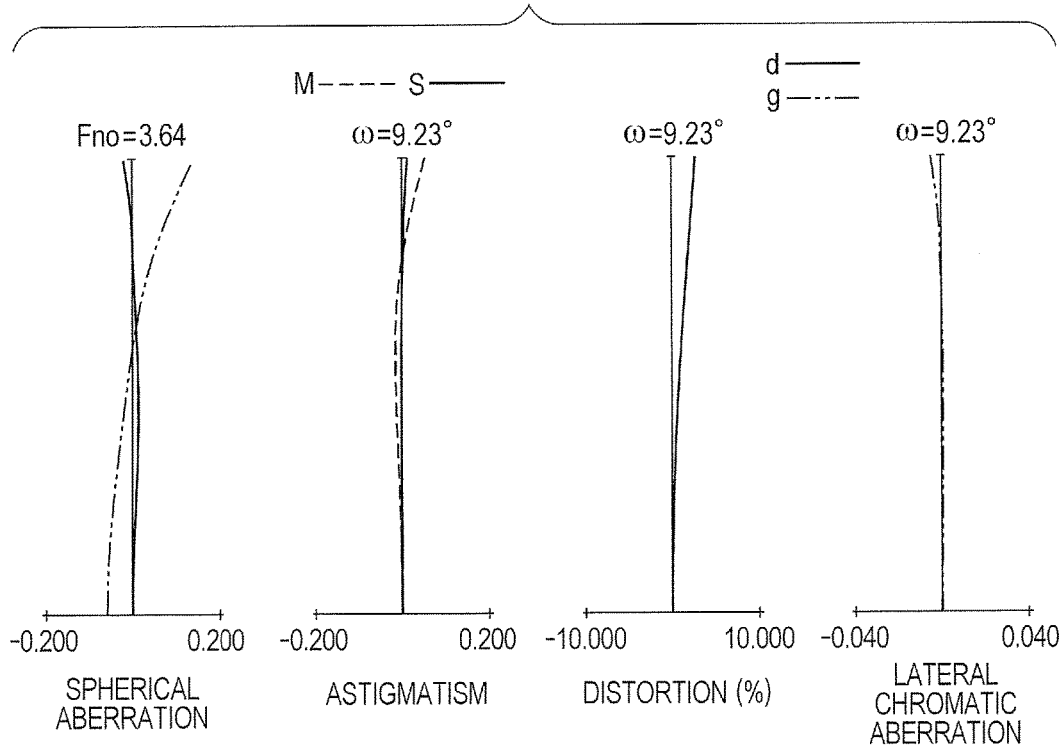
FIG. 12B is aberration diagrams in the state in which focus is at infinity at an intermediate zoom position according to Numerical Embodiment 6.
Figure 12C:
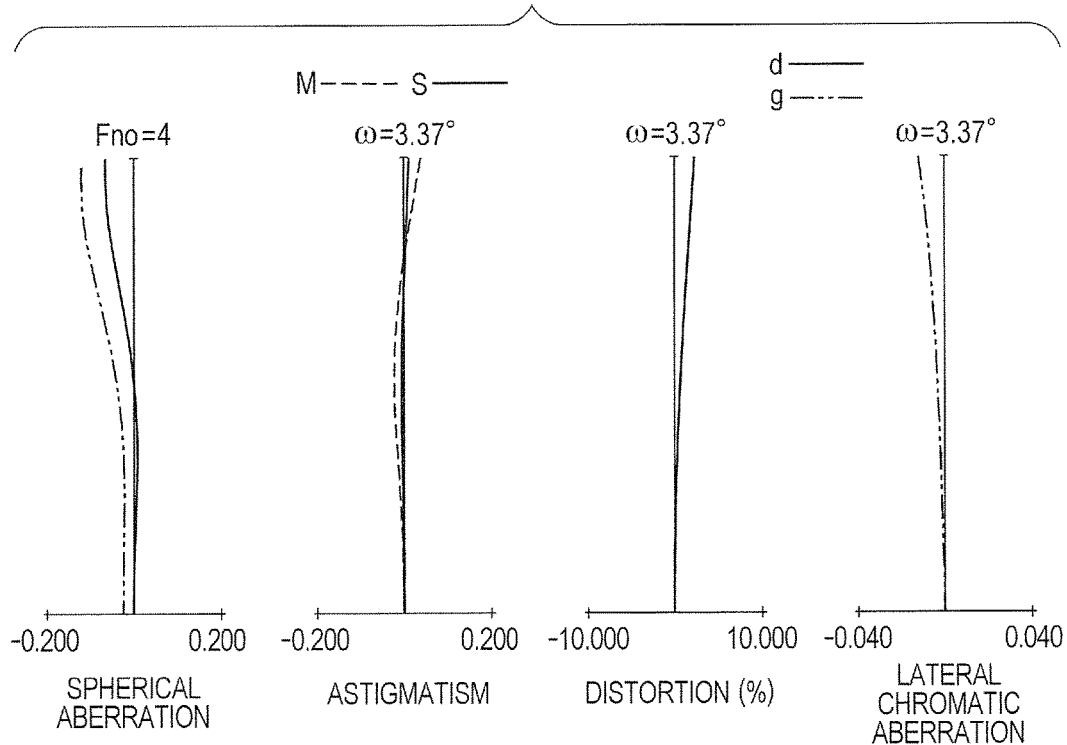
FIG. 12C is aberration diagrams in the state in which focus is at infinity at a telephoto end according to Numerical Embodiment 6.

FIG. 11 is a lens cross-sectional view when the focus is at the infinity at the wide angle end in the zoom lens according to Embodiment 6 (Numerical Embodiment 6) of the present invention. FIG. 12A, FIG. 12B, and FIG. 12C are longitudinal aberration diagrams at the wide angle end, a focal length of 45.60 mm, and the telephoto end, respectively. Each of the aberration diagrams is the longitudinal aberration diagram when the focus is at the infinity. In FIG. 11, the zoom lens includes, in order from the object side to the image side, a first lens group B1, which has a positive refractive power. The zoom lens further includes a second lens group B2 for varying magnification, which is configured to move toward the image side during varying magnification from the wide angle end to the telephoto end, and has a negative refractive power. The second lens group B2 includes two lens units, that is, a first lens subunit B21 and a second lens subunit B22 which are configured to move by different amounts. The zoom lens further includes a third lens group B3 for varying magnification, which is configured to move on the optical axis nonlinearly during varying magnification from the wide angle end to the telephoto end, and has a positive refractive power. The third lens group B3 includes two lens units, that is, a first lens subunit B31 which is fixed during zooming, and a second lens subunit B32 configured to move during zooming. The zoom lens further includes a fourth lens group B4 having a negative refractive power, which is configured to move on the optical axis nonlinearly in conjunction with the movement of the second lens group and the third lens group, to thereby correct an image plane variation accompanying varying magnification. In addition, the fourth lens group moves toward the image side during focusing from an infinity side (solid line in FIG. 11) to a proximity side (broken line in FIG. 11). The zoom lens further includes a rear lens group BR having a positive refractive power, which is configured not to move for varying magnification, and has an image forming action. During varying magnification, intervals between adjacent lens units are changed. An aperture stop is denoted by SP, and an image plane is denoted by I.

Next, the first lens group B1 of Embodiment 6 is described. The first lens group B1 corresponds to a first surface to a seventh surface. The first lens group B1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens group B2 corresponds to an eighth surface to a fifteenth surface, and includes the two lens units, that is, the first lens subunit B21 corresponding to the eighth surface to the thirteenth surface, and the second lens subunit B22 corresponding to the fourteenth surface and the fifteenth surface. The first lens subunit B21 includes a meniscus concave lens having a convex surface on the object side, a meniscus concave lens having a convex surface on the object side, and a meniscus concave lens having a convex surface on the image side. Further, the tenth surface and the eleventh surface have aspherical shapes, and mainly correct curvature of field on the wide angle side. The second lens subunit B22 includes a biconvex lens. An interval between the first lens subunit B21 and the second lens subunit B22 is changed at an intermediate zoom position so that a variation in curvature of field during zooming may be corrected. The aperture stop SP corresponds to a sixteenth surface, and is arranged between the second lens group B2 and the third lens group B3. The third lens group B3 corresponds to a seventeenth surface to a twenty-fifth surface, and includes the lens units, that is, the first lens subunit B31 corresponding to the seventeenth surface and the eighteenth surface, and the second lens subunit B32 corresponding to the nineteenth surface to the twenty-fifth surface. The first lens subunit B31 includes a biconvex lens. The second lens subunit B32 includes a biconvex lens, a cemented lens obtained by cementing a meniscus concave lens having a convex surface on the object side and a biconvex lens, and a biconvex lens. Through arrangement of the first lens subunit B31, which is fixed and has a positive refractive power, the ray height of a ray when the ray enters the second lens subunit B32 can be reduced, and the effective diameter of the second lens subunit B32 can thus be reduced. Consequently, there is provided a structure advantageous in reducing torque for drive of the second lens subunit B32, and correcting aberration during zooming. The nineteenth surface and the twentieth surface have aspherical shapes, and mainly correct a variation in spherical aberration accompanying varying magnification. The fourth lens group B4 corresponds to a twenty-sixth surface to a twenty-eighth surface, and includes a cemented lens obtained by cementing a meniscus convex lens having a convex surface on the image side and a biconcave lens. The rear lens group BR corresponds to a twenty-ninth surface to a thirty-third surface, and includes a cemented lens obtained by cementing a meniscus concave lens having a convex surface on the object side and a biconvex lens, and a biconvex lens. The values of Embodiment 6 corresponding to the respective conditional expressions are shown in Table 1. Embodiment 6 satisfies the expressions (1) to (9), and realizes the zoom lens which is downsized, and has a wide angle, a high zoom ratio, and high optical performance over the entire zoom range.

Embodiment 7

Figure 13:
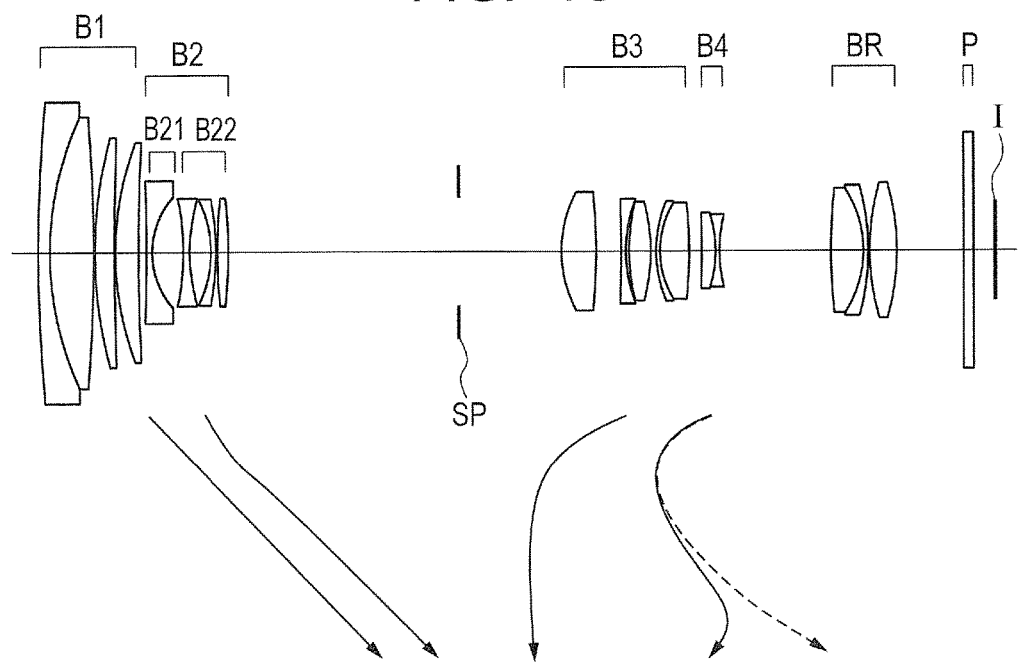
FIG. 13 is a lens cross-sectional view in the state in which focus is at infinity at a wide angle end according to Embodiment 7 (Numerical Embodiment 7) of the present invention.
Figure 14A:
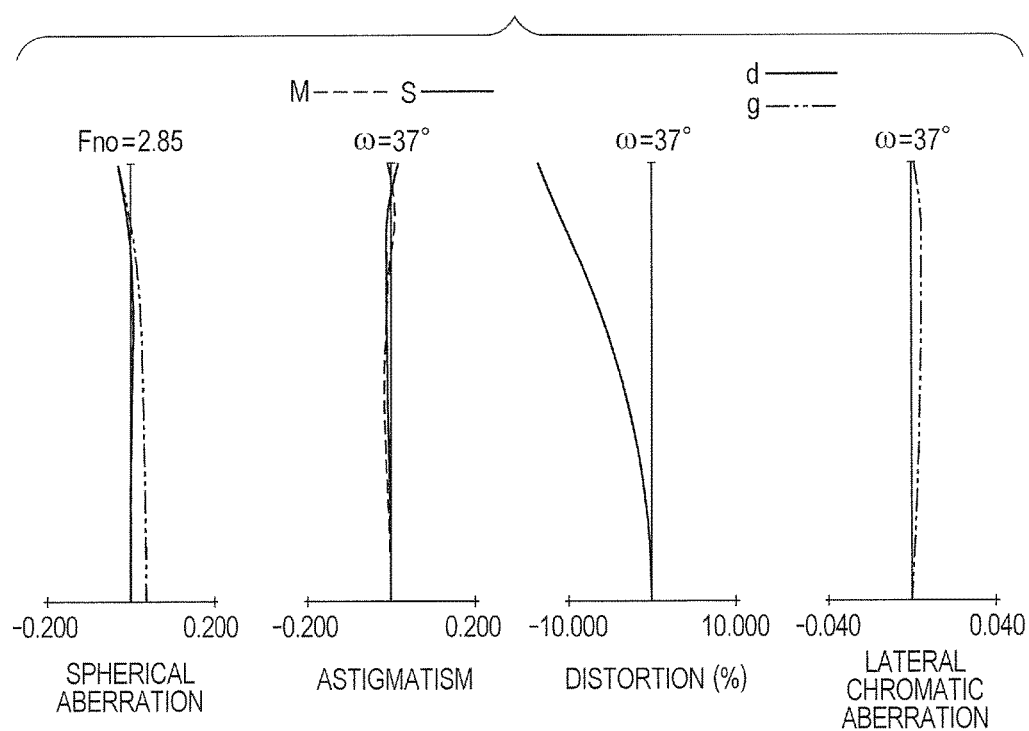
FIG. 14A is aberration diagrams in the state in which focus is at infinity at the wide angle end according to Numerical Embodiment 7.
Figure 14B:
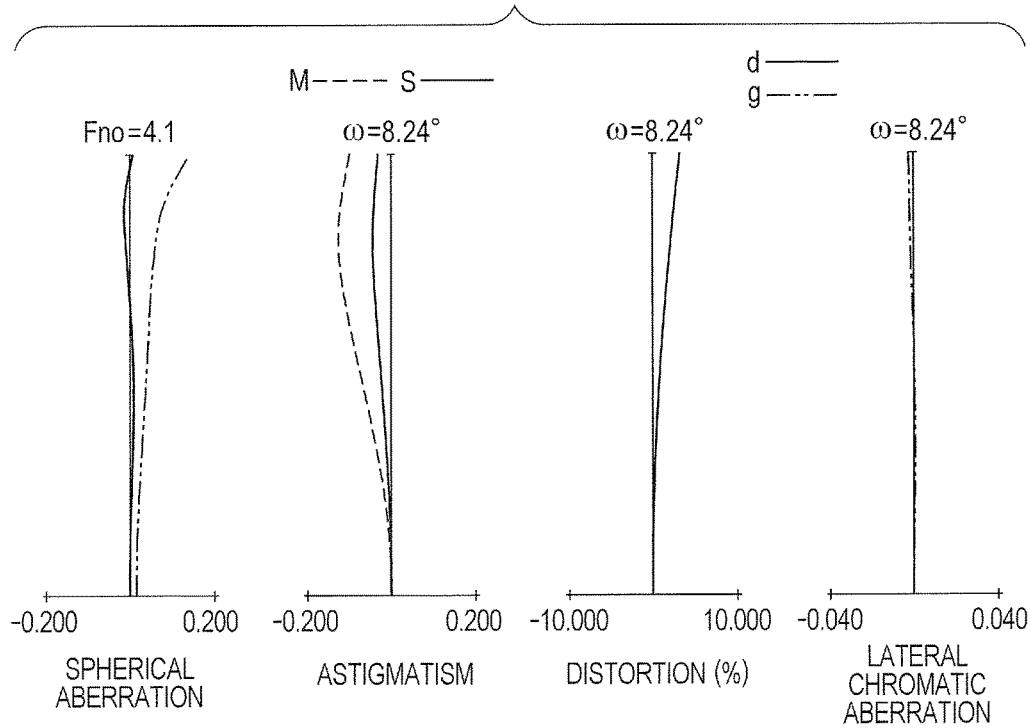
FIG. 14B is aberration diagrams in the state in which focus is at infinity at an intermediate zoom position according to Numerical Embodiment 7.
Figure 14C:
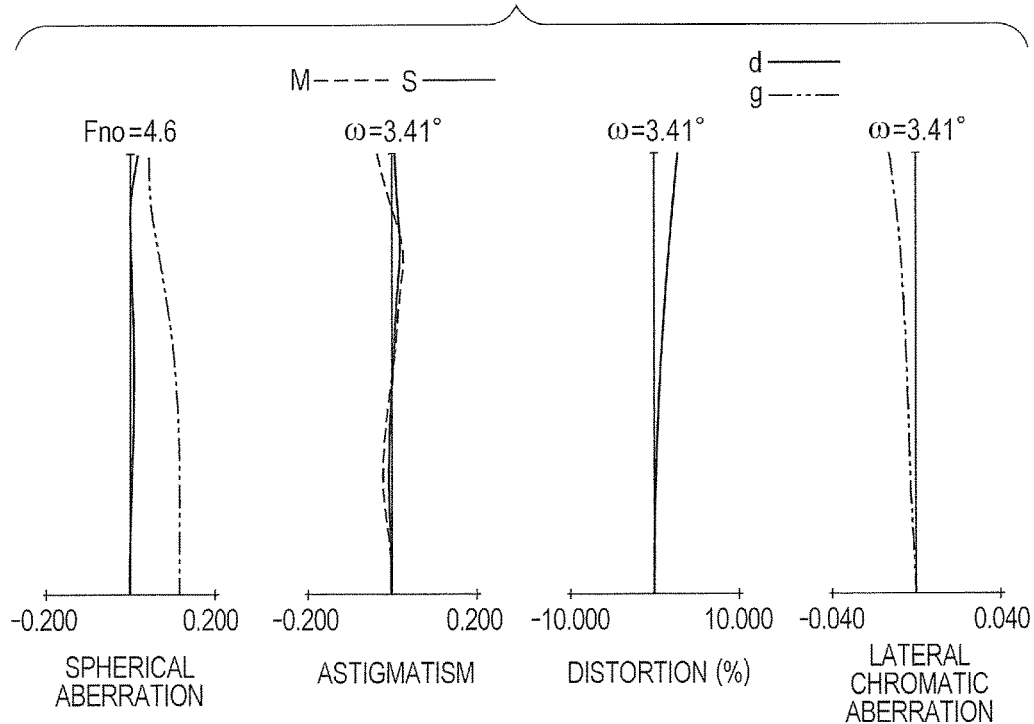
FIG. 14C is aberration diagrams in the state in which focus is at infinity at a telephoto end according to Numerical Embodiment 7.

FIG. 13 is a lens cross-sectional view when the focus is at the infinity at the wide angle end in the zoom lens according to Embodiment 7 (Numerical Embodiment 7) of the present invention. FIG. 14A, FIG. 14B, and FIG. 14C are longitudinal aberration diagrams at the wide angle end, a focal length of 51.17 mm, and the telephoto end, respectively. Each of the aberration diagrams is the longitudinal aberration diagram when the focus is at the infinity. In FIG. 13, the zoom lens includes, in order from the object side to the image side, a first lens group B1, which has a positive refractive power, and a second lens group B2 for varying magnification, which is configured to move toward the image side during varying magnification from the wide angle end to the telephoto end, and has a negative refractive power. The second lens group B2 includes two lens units, that is, a first lens subunit B21 and a second lens subunit B22 which are configured to move by different amounts. The zoom lens further includes a third lens group B3 for varying magnification, which is configured to move on the optical axis nonlinearly during varying magnification from the wide angle end to the telephoto end, and has a positive refractive power. The zoom lens further includes a fourth lens group B4 having a negative refractive power, which is configured to move on the optical axis nonlinearly in conjunction with the movement of the second lens group and the third lens group, to thereby correct an image plane variation accompanying varying magnification. In addition, the fourth lens group moves toward the image side during focusing from an infinity side (solid line in FIG. 13) to a proximity side (broken line in FIG. 13). The zoom lens further includes a rear lens group BR having a positive refractive power, which is configured not to move for varying magnification, and has an image forming action. During varying magnification, intervals between adjacent lens units are changed. An aperture stop is denoted by SP, and an image plane is denoted by I.

Next, the first lens group B1 according to Embodiment 7 is described. The first lens group B1 corresponds to a first surface to a seventh surface. The first lens group B1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens group B2 corresponds to an eighth surface to a fifteenth surface, and is divided into the two lens units, that is, the first lens subunit B21 corresponding to the eighth surface and the ninth surface, and the second lens subunit B22 corresponding to the tenth surface to the fifteenth surface. The first lens subunit B21 includes a biconcave lens. The second lens subunit B22 includes a biconcave lens, a meniscus concave lens having a convex surface on the image side, and a biconvex lens. Further, the tenth surface and the eleventh surface have aspherical shapes, and mainly correct curvature of field on the wide angle side. An interval between the first lens subunit B21 and the second lens subunit B22 is changed at an intermediate zoom position so that a variation in curvature of field during zooming may be corrected. The aperture stop SP corresponds to a sixteenth surface, and is arranged between the second lens group B2 and the third lens group B3. The third lens group B3 corresponds to a seventeenth surface to a twenty-fifth surface. The third lens group B3 includes a biconvex lens, a biconcave lens, a biconvex lens, and a cemented lens obtained by cementing a meniscus concave lens having a convex surface on the object side and a biconvex lens. The seventeenth surface and the eighteenth surface have aspherical shapes, and mainly correct a variation in spherical aberration accompanying varying magnification. The fourth lens group B4 corresponds to a twenty-sixth surface to a twenty-eighth surface, and includes a cemented lens obtained by cementing a meniscus convex lens having a convex surface on the image side and a biconcave lens. The rear lens group BR corresponds to a twenty-ninth surface to a thirty-third surface, and includes a cemented lens obtained by cementing a biconvex lens and a meniscus concave lens having a convex surface on the image side, and a biconvex lens. The values of Embodiment 7 corresponding to the respective conditional expressions are shown in Table 1. Embodiment 7 satisfies the expressions (1) to (9), and realizes the zoom lens which is downsized, and has a wide angle, a high zoom ratio, and high optical performance over the entire zoom range.

Embodiment 8

Figure 15:
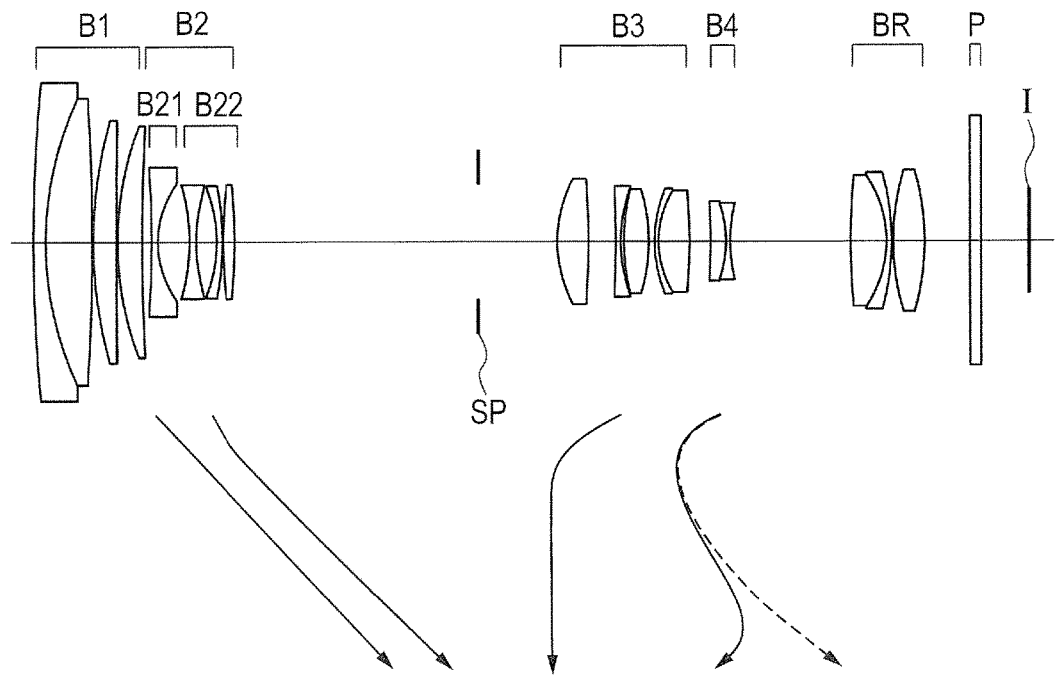
FIG. 15 is a lens cross-sectional view in the state in which focus is at infinity at a wide angle end according to Embodiment 8 (Numerical Embodiment 8) of the present invention.
Figure 16A:
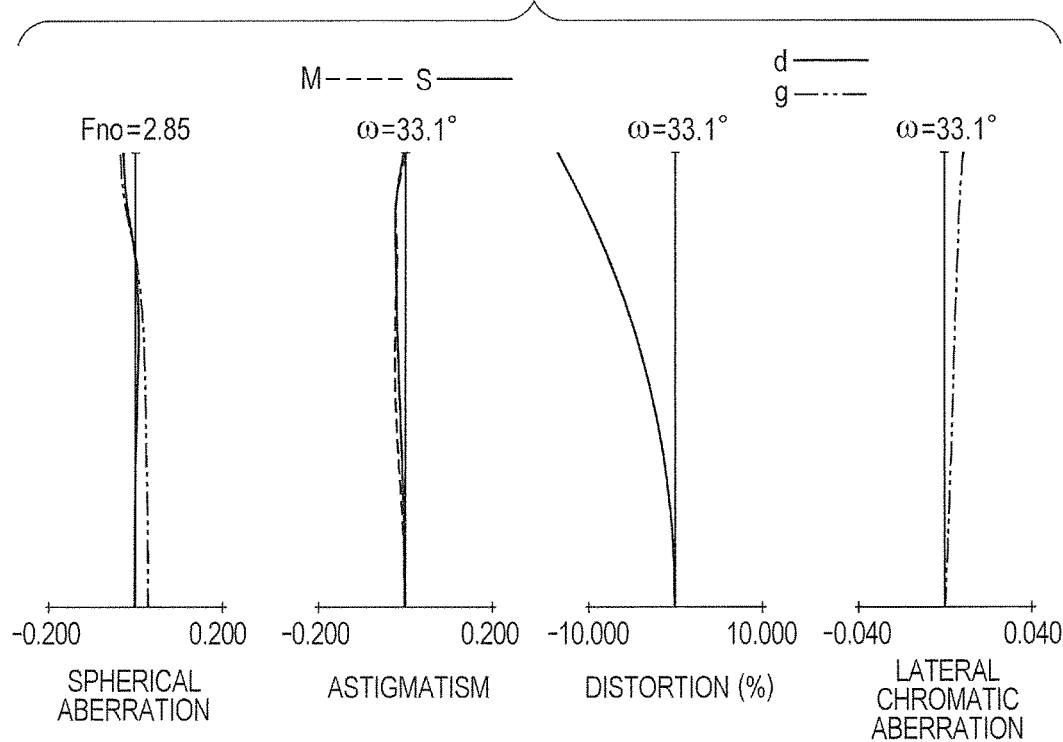
FIG. 16A is aberration diagrams in the state in which focus is at infinity at the wide angle end according to Numerical Embodiment 8.

FIG. 15 is a lens cross-sectional view when the focus is at the infinity at the wide angle end in the zoom lens according to Embodiment 8 (Numerical Embodiment 8) of the present invention. FIG. 16A, FIG. 16B, and FIG. 16C are longitudinal aberration diagrams at the wide angle end, a focal length of 51.67 mm, and the telephoto end, respectively. Each of the aberration diagrams is the longitudinal aberration diagram when the focus is at the infinity. In FIG. 15, the zoom lens includes, in order from the object side to the image side, a first lens group B1, which has a positive refractive power, and a second lens group B2 for varying magnification, which is configured to move toward the image side during varying magnification from the wide angle end to the telephoto end, and has a negative refractive power. The second lens group B2 includes two lens units, that is, a first lens subunit B21 and a second lens subunit B22 which are configured to move by different amounts. The zoom lens further includes a third lens group B3 for varying magnification, which is configured to move on the optical axis nonlinearly during varying magnification from the wide angle end to the telephoto end, and has a positive refractive power. The zoom lens further includes a fourth lens group B4 having a negative refractive power, which is configured to move on the optical axis nonlinearly in conjunction with the movement of the second lens group and the third lens group, to thereby correct an image plane variation accompanying varying magnification. In addition, the fourth lens group moves toward the image side during focusing from an infinity side (solid line in FIG. 15) to a proximity side (broken line in FIG. 15). The zoom lens further includes a rear lens group BR having a positive refractive power, which is configured not to move for varying magnification, and has an image forming action. During varying magnification, intervals between adjacent lens units are changed. An aperture stop is denoted by SP, and an image plane is denoted by I.

Next, the first lens group B1 according to Embodiment 8 is described. The first lens group B1 corresponds to a first surface to a seventh surface. The first lens group B1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens group B2 corresponds to an eighth surface to a fifteenth surface, and includes the two lens units, that is, the first lens subunit B21 corresponding to the eighth surface and the ninth surface, and the second lens subunit B22 corresponding to the tenth surface to the fifteenth surface. The first lens subunit B21 includes a biconcave lens. The second lens subunit B22 includes a biconcave lens, a meniscus concave lens having a convex surface on the image side, and a biconvex lens. Further, the tenth surface and the eleventh surface have aspherical shapes, and mainly correct curvature of field on the wide angle side. An interval between the first lens subunit B21 and the second lens subunit B22 is changed at an intermediate zoom position so that a variation in curvature of field during zooming may be corrected. The aperture stop SP corresponds to a sixteenth surface, and is arranged between the second lens group B2 and the third lens group B3. The third lens group B3 corresponds to a seventeenth surface to a twenty-fifth surface, and includes a biconvex lens, a biconcave lens, a biconvex lens, and a cemented lens obtained by cementing a meniscus concave lens having a convex surface on the object side and a biconvex lens. The seventeenth surface and the eighteenth surface have aspherical shapes, and mainly correct a variation in spherical aberration accompanying varying magnification. The fourth lens group B4 corresponds to a twenty-sixth surface to a twenty-eighth surface, and includes a cemented lens obtained by cementing a meniscus convex lens having a convex surface on the image side and a biconcave lens. The rear lens group BR corresponds to a twenty-ninth surface to a thirty-third surface, and includes a cemented lens obtained by cementing a biconvex lens and a meniscus concave lens having a convex surface on the image side, and a biconvex lens. The values of Embodiment 8 corresponding to the respective conditional expressions are shown in Table 1. Embodiment 8 satisfies the expressions (1) to (9), and realizes the zoom lens which is downsized, and has a wide angle, a high zoom ratio, and high optical performance over the entire zoom range.

Embodiment 9

Figures 17, 18A:
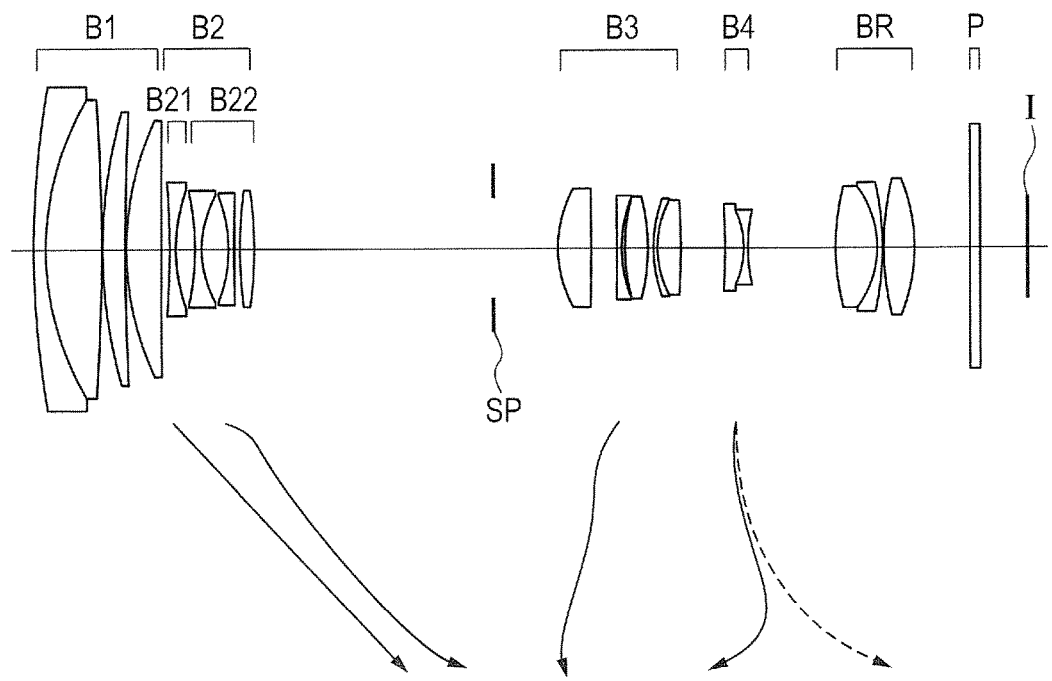
FIG. 17 is a lens cross-sectional view in the state in which focus is at infinity at a wide angle end according to Embodiment 9 (Numerical Embodiment 9) of the present invention.
FIG. 18A is aberration diagrams in the state in which focus is at infinity at the wide angle end according to Numerical Embodiment 9.
Figure 18B:
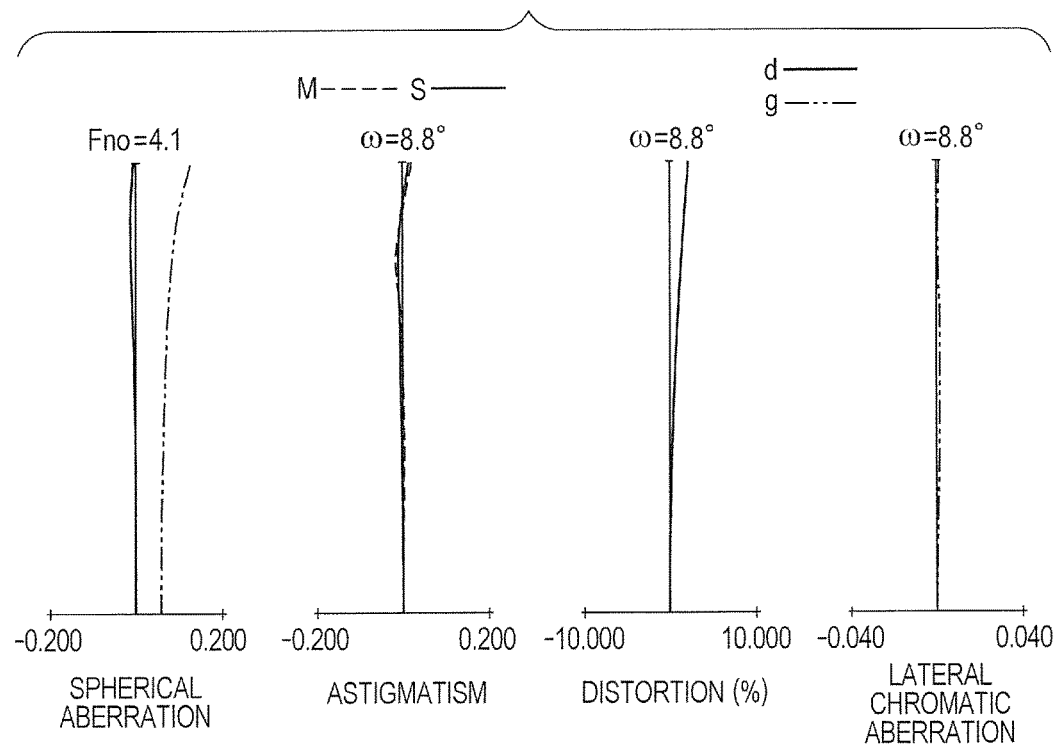
FIG. 18B is aberration diagrams in the state in which focus is at infinity at an intermediate zoom position according to Numerical Embodiment 9.
Figure 18C:
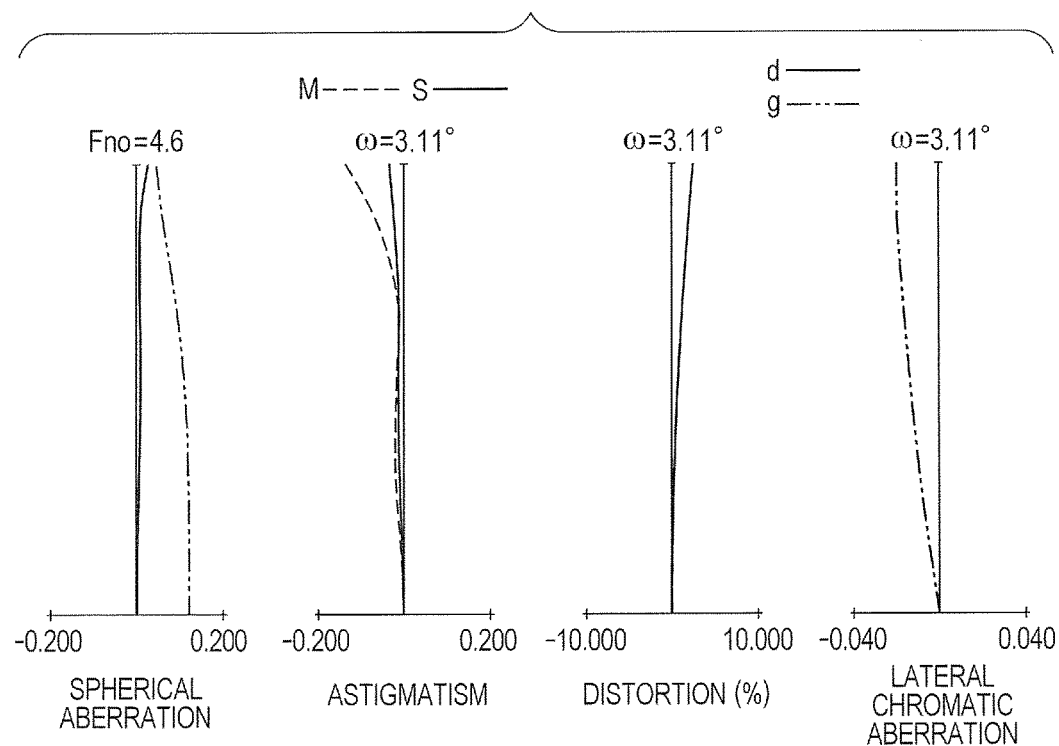
FIG. 18C is aberration diagrams in the state in which focus is at infinity at a telephoto end according to Numerical Embodiment 9.

FIG. 17 is a lens cross-sectional view when the focus is at the infinity at the wide angle end in the zoom lens according to Embodiment 9 (Numerical Embodiment 9) of the present invention. FIG. 18A, FIG. 18B, and FIG. 18C are longitudinal aberration diagrams at the wide angle end, a focal length of 47.86 mm, and the telephoto end, respectively. Each of the aberration diagrams is the longitudinal aberration diagram when the focus is at the infinity. In FIG. 17, the zoom lens includes, in order from the object side to the image side, a first lens group B1, which has a positive refractive power. The zoom lens further includes a second lens group B2 for varying magnification, which is configured to move toward the image side during varying magnification from the wide angle end to the telephoto end, and has a negative refractive power. The second lens group B2 includes two lens units, that is, a first lens subunit B21 and a second lens subunit B22 which are configured to move by different amounts. The zoom lens further includes a third lens group B3 for varying magnification, which is configured to move on the optical axis nonlinearly during varying magnification from the wide angle end to the telephoto end, and has a positive refractive power. The zoom lens further includes a fourth lens group B4 having a negative refractive power, which is configured to move on the optical axis nonlinearly in conjunction with the movement of the second lens group and the third lens group, to thereby correct an image plane variation accompanying varying magnification. In addition, the fourth lens group moves toward the image side during focusing from an infinity side (solid line in FIG. 17) to a proximity side (broken line in FIG. 17). The zoom lens further includes a rear lens group BR having a positive refractive power, which is configured not to move for varying magnification, and has an image forming action. During varying magnification, intervals between adjacent lens units are changed. An aperture stop is denoted by SP, and an image plane is denoted by I.

Next, the first lens group B1 of Embodiment 9 is described. The first lens group B1 corresponds to a first surface to a seventh surface. The first lens group B1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens group B2 corresponds to an eighth surface to a fifteenth surface, and includes the two lens units, that is, the first lens subunit B21 corresponding to the eighth surface and the ninth surface, and the second lens subunit B22 corresponding to the tenth surface to the fifteenth surface. The first lens subunit B21 includes a biconcave lens. The second lens subunit B22 includes a biconcave lens, a biconcave lens, and a biconvex lens. Further, the tenth surface and the eleventh surface have aspherical shapes, and mainly correct curvature of field on the wide angle side. An interval between the first lens subunit B21 and the second lens subunit B22 is changed at an intermediate zoom position so that a variation in curvature of field during zooming may be corrected. The aperture stop SP corresponds to a sixteenth surface, and is arranged between the second lens group B2 and the third lens group B3. The third lens group B3 corresponds to a seventeenth surface to a twenty-fifth surface. The third lens group B3 includes a biconvex lens, a biconcave lens, a biconvex lens, and a cemented lens obtained by cementing a meniscus concave lens having a convex surface on the object side and a biconvex lens. The seventeenth surface and the eighteenth surface have aspherical shapes, and mainly correct a variation in spherical aberration accompanying varying magnification. The fourth lens group B4 corresponds to a twenty-sixth surface to a twenty-eighth surface, and includes a cemented lens obtained by cementing a meniscus convex lens having a convex surface on the image side and a biconcave lens. The rear lens group BR corresponds to a twenty-ninth surface to a thirty-third surface, and includes a cemented lens obtained by cementing a biconvex lens and a meniscus concave lens having a convex surface on the image side, and a biconvex lens. The values of Embodiment 9 corresponding to the respective conditional expressions are shown in Table 1. Embodiment 9 satisfies the expressions (1) to (9), and realizes the zoom lens which is downsized, and has a wide angle, a high zoom ratio, and high optical performance over the entire zoom range.

Numerical Embodiment 1

| Unit mm | | | | |
|---|---|---|---|---|
| Surface data | | | | |
| Surface number i | ri | di | ndi | vdi |
| 1 | 203.590 | 1.73 | 1.91650 | 31.6 |
| 2 | 46.073 | 6.23 | 1.49700 | 81.5 |
| 3 | −338.931 | 0.15 | | |
| 4 | 65.676 | 2.89 | 1.49700 | 81.5 |
| 5 | 423.518 | 0.13 | | |
| 6 | 45.557 | 3.60 | 1.76385 | 48.5 |
| 7 | 352.111 | (Variable) | | |
| 8 | −345.383 | 0.86 | 1.83481 | 42.7 |
| 9 | 11.919 | 4.70 | | |
| 10* | −58.675 | 0.95 | 1.58313 | 59.5 |
| 11* | 26.335 | 2.97 | | |
| 12 | −17.543 | 0.80 | 1.49700 | 81.5 |
| 13 | −47.435 | 0.11 | | |
| 14 | 79.462 | 1.78 | 1.92286 | 18.9 |
| 15 | −64.072 | (Variable) | | |
| 16 (Stop) | ∞ | (Variable) | | |
| 17* | 17.378 | 4.55 | 1.58313 | 59.5 |
| 18* | −59.245 | 3.92 | | |
| 19 | −214.092 | 0.70 | 1.83400 | 37.2 |
| 20 | 19.622 | 0.45 | | |
| 21 | 26.986 | 3.49 | 1.43700 | 95.1 |
| 22 | −27.056 | 1.56 | | |
| 23 | 18.009 | 0.58 | 1.95375 | 32.3 |
| 24 | 12.939 | 3.98 | 1.48749 | 70.2 |
| 25 | −71.491 | (Variable) | | |
| 26 | −265.768 | 1.62 | 1.84666 | 23.9 |
| 27 | −18.099 | 0.58 | 1.78590 | 44.2 |
| 28 | 18.282 | (Variable) | | |
| 29 | 87.178 | 4.77 | 1.48749 | 70.2 |
| 30 | −16.724 | 0.77 | 2.00069 | 25.5 |
| 31 | −33.542 | 0.17 | | |
| 32 | 39.050 | 4.13 | 1.48749 | 70.2 |
| 33 | −31.888 | (Variable) | | |
| 34 | ∞ | 1.44 | 1.51633 | 64.1 |
| 35 | ∞ | (Variable) | | |
| Image plane | ∞ | | | |

| Aspherical data | | |
|---|---|---|
| Tenth surface | | |
| K = 0.00000e+000 | A4 = −3.18873e−005 | A6 = −3.42311e−007 |
| A8 = 1.67887e−009 | | |
| Eleventh surface | | |
| K = 0.00000e+000 | A4 = −6.53597e−005 | A6 = −2.82787e−007 |
| A8 = 1.83322e−009 | | |
| Seventeenth surface | | |
| K = 0.00000e+000 | A4 = −1.69513e−005 | A6 = −1.67145e−008 |
| A8 = −1.47643e−010 | | |
| Eighteenth surface | | |
| K = 0.00000e+000 | A4 = 2.01188e−005 | A6 = −3.66026e−008 |
| A8 = 3.38763e−011 | | |

-continued

| Unit mm | | | |
|---|---|---|---|
| Various data Zoom ratio 14.55 | | | |
| | Wide angle | Intermediate | Telephoto |
| Focal length | 8.55 | 50.26 | 124.40 |
| F number | 2.85 | 4.10 | 4.60 |
| Half angle of view | 37.02 | 8.39 | 3.41 |
| Image height | 6.45 | 7.41 | 7.41 |
| Total lens length | 139.31 | 139.31 | 139.31 |
| BF | 14.02 | 14.02 | 14.02 |
| d7 | 1.12 | 24.36 | 34.32 |
| d15 | 34.47 | 11.23 | 1.27 |
| d16 | 14.88 | 0.98 | 0.96 |
| d25 | 1.85 | 13.96 | 15.98 |
| d28 | 14.82 | 16.60 | 14.60 |
| d33 | 6.19 | 6.19 | 6.19 |
| d35 | 6.87 | 6.87 | 6.87 |

| Zoom lens group data | | |
|---|---|---|
| Group | First surface | Focal length |
| 1 | 1 | 54.94 |
| 2 | 8 | −10.29 |
| SP | 16 | ∞ |
| 3 | 17 | 21.84 |
| 4 | 26 | −23.30 |
| R | 29 | 31.44 |

Numerical Embodiment 2

| Unit mm | | | | |
|---|---|---|---|---|
| Surface data | | | | |
| Surface number i | ri | di | ndi | vdi |
| 1 | 628.518 | 1.71 | 1.90366 | 31.3 |
| 2 | 62.741 | 1.00 | | |
| 3 | 63.212 | 7.46 | 1.49700 | 81.5 |
| 4 | −170.632 | 0.15 | | |
| 5 | 67.586 | 4.64 | 1.53775 | 74.7 |
| 6 | 7465.192 | 0.15 | | |
| 7 | 53.915 | 3.91 | 1.76385 | 48.5 |
| 8 | 163.850 | (Variable) | | |
| 9 | 11891.795 | 0.89 | 1.85135 | 40.1 |
| 10* | 11.946 | 7.12 | | |
| 11 | −17.253 | 0.68 | 1.59522 | 67.7 |
| 12 | 64.849 | 0.14 | | |
| 13 | 42.108 | 2.71 | 1.92286 | 18.9 |
| 14 | −89.121 | (Variable) | | |
| 15 (Stop) | ∞ | (Variable) | | |
| 16* | 14.380 | 4.80 | 1.58313 | 59.4 |
| 17* | −71.741 | 2.38 | | |
| 18 | 69.289 | 0.89 | 1.83400 | 37.2 |
| 19 | 13.817 | 0.91 | | |
| 20 | 23.568 | 3.16 | 1.49700 | 81.5 |
| 21 | −95.858 | 6.51 | | |
| 22 | 25.709 | 3.72 | 1.59522 | 67.7 |
| 23 | −16.166 | 0.60 | 1.69895 | 30.1 |
| 24 | −51.871 | (Variable) | | |
| 25 | −147.095 | 2.11 | 1.95906 | 17.5 |
| 26 | −20.213 | 0.85 | 1.83400 | 37.2 |
| 27 | 14.670 | (Variable) | | |
| 28 | 50.676 | 0.76 | 1.80809 | 22.8 |
| 29 | 17.046 | 3.77 | 1.60342 | 38.0 |
| 30 | 111.069 | 0.10 | | |

-continued

Unit mm

| | | | | |
|---|---|---|---|---|
| 31 | 20.508 | 5.08 | 1.49700 | 81.5 |
| 32 | −34.358 | (Variable) | | |
| 33 | ∞ | 2.00 | 1.51633 | 64.1 |
| 34 | ∞ | (Variable) | | |
| Image plane | ∞ | | | |

Aspherical data

Tenth surface

K = −5.27323e−001  A4 = 1.30485e−005  A6 = 5.15930e−008
A8 = 2.88029e−009  A10 = −2.93057e−011  A12 = 2.02915e−013

Sixteenth surface

K = −8.18409e−002  A4 = −2.12687e−005  A6 = −8.02485e−008
A8 = 3.27136e−010  A10 = −5.43347e−012  A12 = −2.05658e−014

Seventeenth surface

K = −2.56428e+001  A4 = 9.78783e−006  A6 = −5.78943e−008
A8 = 8.16150e−010  A10 = −8.99064e−012  A12 = 6.39737e−015

Various data
Zoom ratio 20.00

| | Wide angle | Intermediate | Telephoto |
|---|---|---|---|
| Focal length | 8.50 | 54.45 | 170.00 |
| F number | 2.70 | 3.96 | 4.50 |
| Half angle of view | 37.14 | 7.74 | 2.49 |
| Image height | 6.44 | 7.40 | 7.40 |
| Total lens length | 144.32 | 144.32 | 144.32 |
| BF | 11.37 | 11.37 | 11.37 |
| d8 | 1.03 | 30.59 | 43.25 |
| d14 | 43.57 | 14.02 | 1.35 |
| d15 | 13.28 | 0.91 | 0.79 |
| d24 | 2.11 | 10.84 | 6.13 |
| d27 | 6.79 | 10.42 | 15.25 |
| d32 | 7.00 | 7.00 | 7.00 |
| d34 | 3.05 | 3.05 | 3.05 |

Zoom lens group data

| Group | First surface | Focal length |
|---|---|---|
| 1 | 1 | 62.18 |
| 2 | 9 | −11.76 |
| SP | 15 | ∞ |
| 3 | 16 | 22.57 |
| 4 | 25 | −17.38 |
| R | 28 | 28.05 |

Numerical Embodiment 3

Unit mm

Surface data

| Surface number i | ri | di | ndi | vdi |
|---|---|---|---|---|
| 1 | 129.873 | 1.62 | 1.91650 | 31.6 |
| 2 | 40.556 | 7.14 | 1.49700 | 81.5 |
| 3 | −4541.873 | 0.17 | | |
| 4 | 50.167 | 3.92 | 1.49700 | 81.5 |
| 5 | 379.118 | 0.17 | | |
| 6 | 43.475 | 3.67 | 1.76385 | 48.5 |
| 7 | 229.615 | (Variable) | | |
| 8 | 344.738 | 0.80 | 1.83481 | 42.7 |
| 9 | 11.000 | 4.20 | | |
| 10* | −1131.597 | 0.61 | 1.58313 | 59.5 |
| 11* | 27.191 | 3.45 | | |
| 12 | −13.399 | 0.60 | 1.43700 | 95.1 |
| 13 | −90.092 | 0.14 | | |
| 14 | 89.207 | 1.90 | 1.92286 | 18.9 |
| 15 | −61.798 | (Variable) | | |
| 16 (Stop) | ∞ | (Variable) | | |
| 17* | 16.682 | 4.32 | 1.58313 | 59.4 |
| 18* | −65.999 | 3.47 | | |
| 19 | 838.885 | 0.63 | 1.83400 | 37.2 |
| 20 | 19.683 | 0.75 | | |
| 21 | 29.127 | 3.80 | 1.43700 | 95.1 |
| 22 | −23.217 | 0.39 | | |
| 23 | 19.352 | 0.60 | 1.95375 | 32.3 |
| 24 | 13.784 | 3.84 | 1.48749 | 70.2 |
| 25 | −84.151 | (Variable) | | |
| 26 | −296.190 | 1.24 | 1.84666 | 23.9 |
| 27 | −20.957 | 0.82 | 1.78590 | 44.2 |
| 28 | 18.696 | (Variable) | | |
| 29 | 47.411 | 4.05 | 1.48749 | 70.2 |
| 30 | −18.173 | 0.73 | 2.00069 | 25.5 |
| 31 | −42.420 | (Variable) | | |
| 32 | 62.639 | 3.24 | 1.48749 | 70.2 |
| 33 | −28.992 | (Variable) | | |
| 34 | ∞ | 1.80 | 1.51633 | 64.1 |
| 35 | ∞ | (Variable) | | |
| Image plane | ∞ | | | |

Aspherical data

Tenth surface

K = 1.94946e+004  A4 = −1.32896e−005  A6 = −6.43513e−007
A8 = 6.18406e−010

Eleventh surface

K = 8.95614e−001  A4 = −5.29842e−005  A6 = −8.12556e−007
A8 = 1.95377e−009

Seventeenth surface

K = −1.04648e+000  A4 = 8.71995e−006  A6 = 3.45366e−008
A8 = 1.02665e−010

Eighteenth surface

K = −4.40946e+001  A4 = 9.89401e−006  A6 = 5.73134e−008
A8 = −2.15226e−010

Various data
Zoom ratio 12.00

| | Wide angle | Intermediate | Telephoto |
|---|---|---|---|
| Focal length | 8.30 | 44.51 | 99.60 |
| F number | 2.50 | 3.27 | 3.60 |
| Half angle of view | 37.84 | 9.45 | 4.25 |
| Image height | 6.45 | 7.41 | 7.41 |
| Total lens length | 126.70 | 126.70 | 126.70 |
| BF | 14.77 | 14.77 | 14.77 |
| d7 | 0.62 | 21.11 | 29.89 |
| d15 | 30.65 | 10.16 | 1.38 |
| d16 | 12.42 | 1.34 | 2.52 |
| d25 | 1.58 | 11.49 | 11.18 |
| d28 | 9.90 | 8.93 | 10.19 |
| d31 | 0.48 | 2.62 | 0.49 |
| d33 | 6.59 | 6.59 | 6.59 |
| d35 | 6.99 | 6.99 | 6.99 |

Zoom lens group data

| Group | First surface | Focal length |
|---|---|---|
| 1 | 1 | 50.34 |
| 2 | 8 | −9.76 |
| SP | 16 | ∞ |
| 3 | 17 | 20.11 |
| 4 | 26 | −23.77 |
| R1 | 29 | 169.15 |
| R2 | 32 | 41.13 |

Numerical Embodiment 4

Unit mm

Surface data

| Surface number i | ri | di | ndi | vdi |
|---|---|---|---|---|
| 1 | 116.966 | 1.50 | 1.91650 | 31.6 |
| 2 | 48.440 | 6.88 | 1.59522 | 67.7 |
| 3 | −349.456 | 0.16 | | |
| 4 | 46.108 | 4.78 | 1.59522 | 67.7 |
| 5 | 330.108 | (Variable) | | |
| 6 | 41.904 | 1.00 | 1.85135 | 40.1 |
| 7* | 15.010 | 4.91 | | |
| 8 | −27.537 | 0.75 | 1.59522 | 67.7 |
| 9 | 19.154 | 2.80 | 1.95906 | 17.5 |
| 10 | 53.022 | 2.60 | | |
| 11 | −18.512 | 0.70 | 1.69680 | 55.5 |
| 12 | −36.450 | (Variable) | | |
| 13 (Stop) | ∞ | (Variable) | | |
| 14* | 16.949 | 4.64 | 1.59349 | 67.0 |
| 15 | −118.473 | 3.51 | | |
| 16 | 75.509 | 1.00 | 1.73800 | 32.3 |
| 17 | 16.049 | 1.01 | | |
| 18* | 18.064 | 3.04 | 1.59349 | 67.0 |
| 19 | −79.933 | 0.31 | | |
| 20 | 34.055 | 2.96 | 1.49700 | 81.5 |
| 21 | −16.710 | 0.94 | 1.65412 | 39.7 |
| 22 | −36.147 | (Variable) | | |
| 23* | −403.662 | 2.20 | 1.95906 | 17.5 |
| 24 | −30.092 | 0.70 | 1.88300 | 40.8 |
| 25 | 14.513 | (Variable) | | |
| 26 | −74.834 | 2.20 | 1.43875 | 94.9 |
| 27* | −52.445 | 0.19 | | |
| 28 | 16.043 | 6.09 | 1.43875 | 94.9 |
| 29 | −42.115 | 0.74 | 1.89286 | 20.4 |
| 30 | −56.899 | (Variable) | | |
| 31 | ∞ | 2.35 | 1.51633 | 64.1 |
| 32 | ∞ | (Variable) | | |
| Image plane | ∞ | | | |

Aspherical data

Seventh surface

K = 2.46057e−001  A4 = −4.69144e−006  A6 = −4.51637e−008
A8 = 6.16198e−010

Fourteenth surface

K = −3.56247e−001  A4 = −8.83698e−006  A6 = −5.57216e−008
A8 = 1.08274e−010

Eighteenth surface

K = 7.36590e−001  A4 = −5.33833e−005  A6 = −7.60453e−009
A8 = −3.80882e−010

Twenty-third surface

K = −5.18031e+002  A4 = 1.09452e−005  A6 = −7.23986e−008
A8 = 5.22786e−010

Twenty-seventh surface

K = 1.38843e+001  A4 = 2.42121e−005  A6 = −7.83006e−008
A8 = 7.86833e−010

Various data
Zoom ratio 12.00

| | Wide angle | Intermediate | Telephoto |
|---|---|---|---|
| Focal length | 10.00 | 73.07 | 120.00 |
| F number | 2.80 | 4.36 | 4.50 |
| Half angle of view | 32.17 | 5.78 | 3.53 |
| Image height | 6.29 | 7.40 | 7.40 |
| Total lens length | 134.79 | 134.79 | 134.79 |
| BF | 9.98 | 9.98 | 9.98 |
| d5 | 0.86 | 33.68 | 39.70 |
| d12 | 40.38 | 7.56 | 1.54 |
| d13 | 10.39 | 2.10 | 1.88 |
| d22 | 1.35 | 10.36 | 12.18 |
| d25 | 16.22 | 15.49 | 13.89 |
| d30 | 5.00 | 5.00 | 5.00 |
| d32 | 3.43 | 3.43 | 3.43 |

Zoom lens group data

| Group | First surface | Focal length |
|---|---|---|
| 1 | 1 | 71.50 |
| 2 | 6 | −11.63 |
| SP | 13 | ∞ |
| 3 | 14 | 18.13 |
| 4 | 23 | −16.44 |
| R | 26 | 29.11 |

Numerical Embodiment 5

Unit mm

Surface data

| Surface number i | ri | di | ndi | vdi |
|---|---|---|---|---|
| 1 | 113.294 | 1.62 | 1.90366 | 31.3 |
| 2 | 47.534 | 6.94 | 1.43875 | 94.9 |
| 3 | −379.596 | 0.17 | | |
| 4 | 47.353 | 3.47 | 1.49700 | 81.5 |
| 5 | 147.758 | 0.17 | | |
| 6 | 64.779 | 2.50 | 1.81600 | 46.6 |
| 7 | 239.700 | (Variable) | | |
| 8 | −679.065 | 0.90 | 1.88300 | 40.8 |
| 9 | 13.196 | 4.44 | | |
| 10* | 1398.192 | 1.00 | 1.58313 | 59.4 |
| 11* | 45.625 | 3.21 | | |
| 12 | −16.786 | 0.60 | 1.43875 | 94.9 |
| 13 | 171.843 | (Variable) | | |
| 14 | 91.324 | 2.42 | 1.92286 | 18.9 |
| 15 | −68.622 | (Variable) | | |
| 16 (Stop) | ∞ | (Variable) | | |
| 17* | 16.709 | 4.50 | 1.61800 | 63.3 |
| 18* | −117.345 | 4.54 | | |
| 19 | 218.578 | 0.63 | 1.88300 | 40.8 |
| 20 | 16.108 | 0.67 | | |
| 21 | 20.453 | 3.80 | 1.43875 | 94.9 |
| 22 | −25.105 | (Variable) | | |
| 23 | 16.700 | 0.60 | 1.95375 | 32.3 |
| 24 | 13.042 | 2.34 | 1.48749 | 70.2 |
| 25 | 101.262 | (Variable) | | |
| 26 | 412.526 | 1.69 | 1.80809 | 22.8 |
| 27 | −25.070 | 0.82 | 1.80440 | 39.6 |
| 28 | 16.975 | (Variable) | | |
| 29 | 75.103 | 3.57 | 1.48749 | 70.2 |
| 30 | −25.288 | 0.73 | 2.00069 | 25.5 |
| 31 | −50.092 | 0.17 | | |
| 32 | 33.179 | 4.03 | 1.48749 | 70.2 |
| 33 | −37.573 | (Variable) | | |
| 34 | ∞ | 1.80 | 1.51633 | 64.1 |
| 35 | ∞ | (Variable) | | |
| Image plane | ∞ | | | |

-continued

Unit mm

Aspherical data

Tenth surface

K = −1.29802e+004  A4 = −1.94184e−005  A6 = −4.52184e−007
A8 = 2.68202e−009

Eleventh surface

K = 3.92504e+000  A4 = −5.17436e−005  A6 = −4.94444e−007
A8 = 2.85052e−009

Seventeenth surface

K = −1.29155e+000  A4 = 2.45980e−005  A6 = 1.39905e−008
A8 = 2.36716e−010

Eighteenth surface

K = −1.57864e+002  A4 = 9.94581e−006  A6 = 2.50437e−008
A8 = −2.04376e−011

Various data
Zoom ratio 20.00

| | Wide angle | Intermediate | Telephoto |
|---|---|---|---|
| Focal length | 8.30 | 55.00 | 166.00 |
| F number | 2.70 | 4.80 | 5.60 |
| Half angle of view | 37.84 | 7.67 | 2.56 |
| Image height | 6.45 | 7.41 | 7.41 |
| Total lens length | 149.39 | 149.39 | 149.39 |
| BF | 13.43 | 13.43 | 13.43 |
| d7 | 0.90 | 28.55 | 40.40 |
| d13 | 0.72 | 0.39 | 0.75 |
| d15 | 40.43 | 13.11 | 0.90 |
| d16 | 20.51 | 2.62 | 0.50 |
| d22 | 3.18 | 6.32 | 0.19 |
| d25 | 2.08 | 15.14 | 18.63 |
| d28 | 12.60 | 14.28 | 19.06 |
| d33 | 4.97 | 4.97 | 4.97 |
| d35 | 7.27 | 7.27 | 7.27 |

Zoom lens group data (wide angle end state)

| Group | First surface | Focal length |
|---|---|---|
| 1 | 1 | 63.63 |
| 2 | 8 | −11.37 |
| SP | 16 | ∞ |
| 3 | 17 | 23.66 |
| 4 | 26 | −22.15 |
| R | 29 | 30.40 |

Numerical Embodiment 6

Unit mm

Surface data

| Surface number i | ri | di | ndi | vdi |
|---|---|---|---|---|
| 1 | 112.928 | 1.62 | 2.00330 | 28.3 |
| 2 | 51.708 | 9.43 | 1.49700 | 81.5 |
| 3 | −1538.589 | 0.17 | | |
| 4 | 56.271 | 4.84 | 1.49700 | 81.5 |
| 5 | 204.533 | 0.17 | | |
| 6 | 55.495 | 3.81 | 1.76385 | 48.5 |
| 7 | 229.615 | (Variable) | | |
| 8 | 1072.212 | 0.80 | 1.88300 | 40.8 |
| 9 | 12.839 | 3.49 | | |
| 10* | 8802.672 | 1.20 | 1.59522 | 67.7 |
| 11* | 39.328 | 3.17 | | |
| 12 | −16.089 | 0.60 | 1.59522 | 67.7 |
| 13 | −298.012 | (Variable) | | |
| 14 | 125.068 | 1.59 | 1.92286 | 18.9 |
| 15 | −68.622 | (Variable) | | |
| 16 (Stop) | ∞ | 1.00 | | |
| 17 | 200.000 | 2.00 | 1.77250 | 49.6 |
| 18 | −200.000 | (Variable) | | |
| 19* | 17.029 | 4.72 | 1.58313 | 59.4 |
| 20* | −132.441 | 4.23 | | |
| 21 | 124.990 | 0.63 | 1.83400 | 37.2 |
| 22 | 12.756 | 5.55 | 1.43700 | 95.1 |
| 23 | −31.824 | 0.57 | | |
| 24 | 29.028 | 2.00 | 1.61800 | 63.3 |
| 25 | −285.945 | (Variable) | | |
| 26 | −1421.717 | 1.82 | 1.84666 | 23.9 |
| 27 | −31.217 | 0.82 | 1.78590 | 44.2 |
| 28 | 16.605 | (Variable) | | |
| 29 | 98.806 | 0.70 | 2.00069 | 25.5 |
| 30 | 22.514 | 3.51 | 1.48749 | 70.2 |
| 31 | −69.070 | 0.17 | | |
| 32 | 20.267 | 4.48 | 1.48749 | 70.2 |
| 33 | −43.325 | (Variable) | | |
| 34 | ∞ | 1.80 | 1.51633 | 64.1 |
| 35 | ∞ | 7.17 | | |
| 36 | ∞ | (Variable) | | |
| Image plane | ∞ | | | |

Aspherical data

Tenth surface

K = 5.88791e+005  A4 = 1.02511e−004  A6 = −1.45501e−006
A8 = 7.96028e−009

Eleventh surface

K = 1.17893e+001  A4 = 6.36708e−005  A6 = −1.67337e−006
A8 = 8.77880e−009

Nineteenth surface

K = −1.50523e+000  A4 = 3.08137e−005  A6 = 2.01178e−008
A8 = 1.64397e−010

Twentieth surface

K = −2.41758e+002  A4 = 1.01897e−005  A6 = 3.99992e−008
A8 = −1.48204e−010

Various data
Zoom ratio 15.00

| | Wide angle | Intermediate | Telephoto |
|---|---|---|---|
| Focal length | 8.40 | 45.60 | 126.00 |
| F number | 2.80 | 3.64 | 4.00 |
| Half angle of view | 37.50 | 9.23 | 3.37 |
| Image height | 6.45 | 7.41 | 7.41 |
| Total lens length | 144.46 | 144.46 | 144.46 |
| BF | 12.37 | 12.37 | 12.37 |
| d7 | 0.61 | 26.92 | 38.20 |
| d13 | 1.54 | 1.03 | 2.18 |
| d15 | 39.32 | 13.52 | 1.10 |
| d18 | 12.91 | 0.93 | 0.43 |
| d25 | 1.90 | 10.26 | 12.48 |
| d28 | 12.70 | 16.33 | 14.61 |
| d33 | 3.96 | 3.96 | 3.96 |
| d36 | 0.06 | 0.06 | 0.06 |

Zoom lens group data (wide angle end state)

| Group | First surface | Focal length |
|---|---|---|
| 1 | 1 | 61.70 |
| 2 | 8 | −9.78 |
| SP | 16 | ∞ |
| 3 | 17 | 22.27 |
| 4 | 26 | −21.75 |
| R | 29 | 33.05 |

Numerical Embodiment 7

| Unit mm | | | | |
|---|---|---|---|---|
| Surface data | | | | |
| Surface number i | ri | di | ndi | vdi |
| 1 | 240.713 | 1.73 | 1.91650 | 31.6 |
| 2 | 48.058 | 6.58 | 1.49700 | 81.5 |
| 3 | −246.255 | 0.15 | | |
| 4 | 64.354 | 2.96 | 1.49700 | 81.5 |
| 5 | 469.898 | 0.13 | | |
| 6 | 45.952 | 3.46 | 1.76385 | 48.5 |
| 7 | 309.726 | (Variable) | | |
| 8 | −342.040 | 0.86 | 1.83481 | 42.7 |
| 9 | 12.458 | (Variable) | | |
| 10* | −50.637 | 0.95 | 1.58313 | 59.4 |
| 11* | 22.440 | 3.26 | | |
| 12 | −16.993 | 0.80 | 1.43875 | 94.9 |
| 13 | −39.770 | 0.20 | | |
| 14 | 77.241 | 1.66 | 1.92286 | 18.9 |
| 15 | −71.793 | (Variable) | | |
| 16 (Stop) | ∞ | (Variable) | | |
| 17* | 18.102 | 5.20 | 1.58313 | 59.4 |
| 18* | −74.367 | 3.77 | | |
| 19 | −234.951 | 0.70 | 1.83400 | 37.2 |
| 20 | 21.418 | 0.50 | | |
| 21 | 31.249 | 3.24 | 1.43875 | 94.9 |
| 22 | −27.334 | (Variable) | | |
| 23 | 19.127 | 0.58 | 1.95375 | 32.3 |
| 24 | 13.665 | 4.37 | 1.48749 | 70.2 |
| 25 | −68.800 | (Variable) | | |
| 26 | −183.788 | 2.07 | 1.84666 | 23.8 |
| 27 | −18.352 | 0.58 | 1.78590 | 44.2 |
| 28 | 21.968 | (Variable) | | |
| 29 | 85.026 | 4.86 | 1.48749 | 70.2 |
| 30 | −16.784 | 0.77 | 2.00069 | 25.5 |
| 31 | −35.612 | 0.17 | | |
| 32 | 35.250 | 4.10 | 1.48749 | 70.2 |
| 33 | −36.010 | (Variable) | | |
| 34 | ∞ | 1.50 | 1.51633 | 64.1 |
| 35 | ∞ | (Variable) | | |
| Image plane | ∞ | | | |

| Aspherical data |
|---|
| Tenth surface |

K = 0.00000e+000   A4 = −5.53243e−005   A6 = 1.26334e−007
A8 = −2.77480e−010

Eleventh surface

K = 0.00000e+000   A4 = −9.06653e−005   A6 = 2.16446e−007
A8 = −2.42033e−010

Seventeenth surface

K = 0.00000e+000   A4 = −1.19873e−005   A6 = −4.62399e−008
A8 = 1.65891e−010

Eighteenth surface

K = 0.00000e+000   A4 = 1.98778e−005   A6 = −6.34399e−008
A8 = 3.26625e−010

| Various data Zoom ratio 14.55 | | | |
|---|---|---|---|
| | Wide angle | Intermediate | Telephoto |
| Focal length | 8.55 | 51.17 | 124.40 |
| F number | 2.85 | 4.10 | 4.60 |
| Half angle of view | 37.02 | 8.24 | 3.41 |
| Image height | 6.45 | 7.41 | 7.41 |
| Total lens length | 143.16 | 143.16 | 143.16 |
| BF | 14.24 | 14.24 | 14.24 |
| d7 | 1.19 | 24.42 | 34.37 |
| d9 | 4.63 | 4.10 | 4.58 |
| d15 | 34.47 | 11.78 | 1.33 |
| d16 | 15.44 | 0.96 | 1.60 |
| d22 | 0.80 | 0.80 | 0.80 |
| d25 | 1.89 | 15.28 | 16.61 |
| d28 | 16.85 | 17.94 | 15.97 |
| d33 | 6.42 | 6.42 | 6.42 |
| d35 | 6.84 | 6.84 | 6.84 |

| Zoom lens group data (wide angle end state) | | |
|---|---|---|
| Group | First surface | Focal length |
| 1 | 1 | 54.55 |
| 2 | 8 | −10.27 |
| SP | 16 | ∞ |
| 3 | 17 | 22.66 |
| 4 | 26 | −26.84 |
| R | 29 | 33.32 |

Numerical Embodiment 8

| Unit mm | | | | |
|---|---|---|---|---|
| Surface data | | | | |
| Surface number i | ri | di | ndi | vdi |
| 1 | 239.441 | 1.73 | 1.91650 | 31.6 |
| 2 | 47.515 | 6.63 | 1.49700 | 81.5 |
| 3 | −331.665 | 0.15 | | |
| 4 | 63.043 | 3.30 | 1.49700 | 81.5 |
| 5 | 1937.835 | 0.13 | | |
| 6 | 45.623 | 3.48 | 1.76385 | 48.5 |
| 7 | 306.587 | (Variable) | | |
| 8 | −144.621 | 0.86 | 1.83481 | 42.7 |
| 9 | 13.998 | (Variable) | | |
| 10* | −31.968 | 0.95 | 1.58313 | 59.4 |
| 11* | 22.771 | 2.94 | | |
| 12 | −20.484 | 0.80 | 1.43875 | 94.9 |
| 13 | −41.458 | 0.11 | | |
| 14 | 69.440 | 1.69 | 1.92286 | 18.9 |
| 15 | −77.197 | (Variable) | | |
| 16 (Stop) | ∞ | (Variable) | | |
| 17* | 18.267 | 4.44 | 1.58313 | 59.4 |
| 18* | −84.629 | 3.85 | | |
| 19 | −196.103 | 0.70 | 1.83400 | 37.2 |
| 20 | 21.699 | 0.45 | | |
| 21 | 30.253 | 3.54 | 1.43875 | 94.9 |
| 22 | −25.349 | 0.80 | | |
| 23 | 19.304 | 0.58 | 1.95375 | 32.3 |
| 24 | 13.881 | 4.39 | 1.48749 | 70.2 |
| 25 | −75.273 | (Variable) | | |
| 26 | −124.442 | 2.23 | 1.84666 | 23.8 |
| 27 | −16.011 | 0.58 | 1.78590 | 44.2 |
| 28 | 23.070 | (Variable) | | |
| 29 | 98.878 | 5.07 | 1.48749 | 70.2 |
| 30 | −16.186 | 0.77 | 2.00069 | 25.5 |
| 31 | −35.084 | 0.17 | | |
| 32 | 33.585 | 4.49 | 1.48749 | 70.2 |
| 33 | −35.391 | (Variable) | | |
| 34 | ∞ | 1.60 | 1.51633 | 64.1 |
| 35 | ∞ | (Variable) | | |
| Image plane | ∞ | | | |

| Aspherical data |
|---|
| Tenth surface |

K = 0.00000e+000   A4 = −4.52156e−005   A6 = 1.52174e−007
A8 = 1.30021e−009

-continued

Unit mm

Eleventh surface

K = 0.00000e+000  A4 = −7.82277e−005  A6 = 2.85310e−007
A8 = 7.82520e−010

Seventeenth surface

K = 0.00000e+000  A4 = −9.01866e−006  A6 = −5.47165e−008
A8 = 3.07282e−010

Eighteenth surface

K = 0.00000e+000  A4 = 2.16768e−005  A6 = −7.40304e−008
A8 = 4.56859e−010

Various data
Zoom ratio 13.00

|  | Wide angle | Intermediate | Telephoto |
|---|---|---|---|
| Focal length | 9.91 | 51.67 | 128.78 |
| F number | 2.85 | 4.10 | 4.60 |
| Half angle of view | 33.05 | 8.16 | 3.29 |
| Image height | 6.45 | 7.41 | 7.41 |
| Total lens length | 140.81 | 140.81 | 140.81 |
| BF | 14.24 | 14.24 | 14.24 |
| d7 | 1.37 | 24.01 | 33.71 |
| d9 | 4.46 | 3.65 | 4.64 |
| d15 | 34.47 | 12.64 | 1.95 |
| d16 | 11.29 | 0.95 | 0.95 |
| d25 | 2.98 | 14.38 | 13.75 |
| d28 | 17.18 | 16.11 | 16.75 |
| d33 | 6.39 | 6.39 | 6.39 |
| d35 | 6.79 | 6.79 | 6.79 |

Zoom lens group data (wide angle end state)

| Group | First surface | Focal length |
|---|---|---|
| 1 | 1 | 53.18 |
| 2 | 8 | −10.61 |
| SP | 16 | ∞ |
| 3 | 17 | 22.67 |
| 4 | 26 | −26.77 |
| R | 29 | 33.91 |

Numerical Embodiment 9

Unit mm

Surface data

| Surface number i | ri | di | ndi | vdi |
|---|---|---|---|---|
| 1 | 136.108 | 1.73 | 1.91650 | 31.6 |
| 2 | 42.051 | 8.04 | 1.43875 | 94.9 |
| 3 | −319.896 | 0.15 | | |
| 4 | 72.152 | 3.26 | 1.43875 | 94.9 |
| 5 | 416.653 | 0.13 | | |
| 6 | 43.712 | 5.02 | 1.76385 | 48.5 |
| 7 | 1640.852 | (Variable) | | |
| 8 | −119.700 | 0.86 | 2.00330 | 28.3 |
| 9 | 24.879 | (Variable) | | |
| 10* | −36.307 | 0.95 | 1.58313 | 59.4 |
| 11* | 15.028 | 3.87 | | |
| 12 | −21.246 | 0.80 | 1.43875 | 94.9 |
| 13 | 283.648 | 0.94 | | |
| 14 | 61.369 | 2.07 | 1.92286 | 18.9 |
| 15 | −59.358 | (Variable) | | |
| 16 (Stop) | ∞ | (Variable) | | |
| 17* | 17.040 | 4.81 | 1.58313 | 59.4 |
| 18* | −259.082 | 3.68 | | |
| 19 | −930.720 | 0.70 | 1.83400 | 37.2 |
| 20 | 19.555 | 0.46 | | |
| 21 | 27.336 | 3.33 | 1.43875 | 94.9 |
| 22 | −29.161 | 0.80 | | |
| 23 | 20.401 | 0.58 | 1.95375 | 32.3 |
| 24 | 14.589 | 3.38 | 1.48749 | 70.2 |
| 25 | −92.685 | (Variable) | | |
| 26 | −101.760 | 2.70 | 1.84666 | 23.8 |
| 27 | −12.555 | 0.58 | 1.78590 | 44.2 |
| 28 | 24.211 | (Variable) | | |
| 29 | 33.495 | 6.04 | 1.48749 | 70.2 |
| 30 | −14.418 | 0.77 | 2.00069 | 25.5 |
| 31 | −41.798 | 0.17 | | |
| 32 | 40.341 | 4.48 | 1.48749 | 70.2 |
| 33 | −25.641 | (Variable) | | |
| 34 | ∞ | 1.45 | 1.51633 | 64.1 |
| 35 | ∞ | (Variable) | | |
| Image plane | ∞ | | | |

Aspherical data

Tenth surface

K = 0.00000e+000  A4 = 2.36968e−005  A6 = −4.19034e−007
A8 = 4.06008e−009

Eleventh surface

K = 0.00000e+000  A4 = −2.62604e−005  A6 = −6.46769e−007
A8 = 6.92358e−009

Seventeenth surface

K = 0.00000e+000  A4 = −1.13595e−005  A6 = −4.28085e−008
A8 = 5.82192e−011

Eighteenth surface

K = 0.00000e+000  A4 = 1.55704e−005  A6 = −5.05319e−008
A8 = 2.39408e−010

Various data
Zoom ratio 13.00

|  | Wide angle | Intermediate | Telephoto |
|---|---|---|---|
| Focal length | 10.50 | 47.86 | 136.46 |
| F number | 2.85 | 4.10 | 4.60 |
| Half angle of view | 31.56 | 8.80 | 3.11 |
| Image height | 6.45 | 7.41 | 7.41 |
| Total lens length | 143.15 | 143.15 | 143.15 |
| BF | 15.83 | 15.83 | 15.83 |
| d7 | 1.24 | 23.93 | 33.66 |
| d9 | 2.77 | 0.80 | 3.14 |
| d15 | 34.47 | 13.75 | 1.69 |
| d16 | 9.44 | 3.07 | 1.23 |
| d25 | 6.35 | 16.74 | 12.42 |
| d28 | 12.74 | 8.72 | 14.88 |
| d33 | 7.99 | 7.99 | 7.99 |
| d35 | 6.89 | 6.89 | 6.89 |

Zoom lens group data (wide angle end state)

| Group | First surface | Focal length |
|---|---|---|
| 1 | 1 | 52.01 |
| 2 | 8 | −8.76 |
| SP | 16 | ∞ |
| 3 | 17 | 24.90 |
| 4 | 26 | −27.54 |
| R | 29 | 30.90 |

| Conditional Expression | Embodiment | | | | | | | | |
|---|---|---|---|---|---|---|---|---|---|
| | 1 | 2 | 3 | 4 | 5 | 6 | 7 | 8 | 9 |
| (1) f1/fw | 6.426 | 7.315 | 6.065 | 7.150 | 7.666 | 7.345 | 6.380 | 5.368 | 4.955 |
| (2) M2/Mv | −2.385 | −3.381 | −2.957 | −4.566 | −1.719 | −3.061 | −2.398 | −3.145 | −3.995 |
| (3) Mv/fw | −1.628 | −1.469 | −1.192 | −0.851 | −2.771 | −1.486 | −1.619 | −1.044 | −0.782 |
| (4) Nd1pr/Nd1pf | 1.178 | 1.162 | 1.178 | 1.000 | 1.237 | 1.178 | 1.178 | 1.178 | 1.178 |
| (5) f1/f2 | −5.339 | −5.288 | −5.158 | −6.150 | −5.597 | −6.309 | −5.311 | −5.011 | −5.941 |
| (6) f3/fw | 2.554 | 2.655 | 2.423 | 1.813 | 2.850 | 2.651 | 2.651 | 2.288 | 2.372 |
| (7) f4/fw | −2.725 | −2.044 | −2.864 | −1.644 | −2.668 | −2.589 | −3.140 | −2.702 | −2.624 |
| (8) M2/f2 | −3.226 | −3.590 | −2.998 | −3.341 | −3.477 | −3.909 | −3.231 | −3.065 | −3.745 |
| (9) $(1 - \beta 4w^2)\beta Rw^2$ | −2.300 | −2.364 | −2.027 | −3.620 | −2.402 | −2.500 | −2.092 | −2.190 | −1.622 |
| f1 | 54.943 | 62.179 | 50.343 | 71.502 | 63.630 | 61.698 | 54.549 | 53.176 | 52.011 |
| f2 | −10.290 | −11.758 | −9.760 | −11.626 | −11.369 | −9.779 | −10.271 | −10.612 | −8.755 |
| f3 | 21.836 | 22.572 | 20.110 | 18.132 | 23.657 | 22.270 | 22.663 | 22.670 | 24.897 |
| f4 | −23.297 | −17.377 | −23.771 | −16.436 | −22.148 | −21.751 | −26.844 | −26.770 | −27.539 |
| fw | 8.550 | 8.500 | 8.300 | 10.000 | 8.300 | 8.400 | 8.550 | 9.906 | 10.497 |
| M2 | 33.200 | 42.216 | 29.262 | 38.840 | 39.534 | 38.221 | 33.182 | 32.525 | 32.787 |
| | Group B2 | Group B2 | Group B2 | Group B2 | Unit B22 | Unit B22 | Unit B21 | Unit B22 | Unit B22 |
| Mv | −13.920 | −12.487 | −9.895 | −8.507 | −23.002 | −12.486 | −13.840 | −10.342 | −8.206 |
| | Group B3 | Group B3 | Group B3 | Group B3 | Unit B32 | Unit B32 | Group B3 | Group B3 | Group B3 |
| Nd1pr | 1.764 | 1.764 | 1.764 | 1.595 | 1.816 | 1.764 | 1.764 | 1.764 | 1.764 |
| Nd1pf | 1.497 | 1.517 | 1.497 | 1.595 | 1.468 | 1.497 | 1.497 | 1.497 | 1.497 |
| β4w | 3.217 | 3.220 | 2.957 | 3.726 | 3.161 | 2.841 | 2.982 | 3.000 | 3.420 |
| βRw | 0.497 | 0.502 | 0.512 | 0.530 | 0.490 | 0.594 | 0.515 | 0.523 | 0.389 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-156315, filed Aug. 9, 2016, which is hereby incorporated by reference herein in its entirety.

What is claimed is:

1. A zoom lens, comprising, in order from an object side to an image side:
   a first lens group which is not moved for zooming and is composed of a single lens unit having a positive refractive power;
   a second lens group which has a negative refractive power and comprises at least one lens unit each of which is moved toward an image side during zooming from a wide angle end to a telephoto end;
   a third lens group which has a positive refractive power and comprises at least one lens unit each of which is moved toward the object side during zooming from the wide angle end to the telephoto end;
   a fourth lens group which is configured to move during zooming and focusing and is composed of a single lens unit having a negative refractive power; and
   a rear lens group which is composed of at least one lens unit,
   wherein intervals between adjacent lens units are changed during zooming,
   wherein the first lens group comprises at least three lenses, and
   wherein the following conditional expressions are satisfied:

$4.80 < f1/fw < 8.00$;

$-5.00 < M2/Mv < -1.50$;

$-3.50 < Mv/fw < -0.77$; and $0.99 < Nd1pr/Nd1pf < 1.40$, where f1 represents a focal length of the first lens group, fw represents a focal length of the zoom lens at the wide angle end, M2 represents an amount of movement of a lens unit which is moved by a largest amount during zooming from the wide angle end to the telephoto end in the second lens group, Mv represents an amount of movement of a lens unit which is moved by a largest amount during zooming from the wide angle end to the telephoto end among lens units which are moved toward an object side during zooming from the wide angle end to the telephoto end, Nd1pr represents a refractive index with respect to a d-line of a material of a positive lens G1pr arranged closest to the image side in the first lens group, Nd1pf represents an average of refractive indices with respect to the d-line of materials of positive lenses included in the first lens group other than the positive lens G1pr, and a sign of an amount of movement of a lens unit is defined as positive when the lens unit is located closer to the image side at the telephoto end than at the wide angle end.

2. The zoom lens according to claim 1, wherein the following conditional expression is satisfied:

$-7.00 < f1/f2 < -4.50$, where f1 represents the focal length of the first lens group, and f2 represents a combined focal length of the lens units of the second lens group at the wide angle end in which focus is at infinity.

3. The zoom lens according to claim 1, wherein the following conditional expression is satisfied:

$1.50 < f3/fw < 3.50$, where f3 represents a combined focal length of the lens units of the third lens group at the wide angle end in which focus is at infinity, and fw represents the focal length of the zoom lens at the wide angle end.

4. The zoom lens according to claim 1, wherein the following conditional expression is satisfied:

$-4.00 < f4/fw < -1.00$, where f4 represents a focal length of the fourth lens group, and fw represents the focal length of the zoom lens at the wide angle end.

5. The zoom lens according to claim 1, wherein the third lens group comprises a negative lens.

6. The zoom lens according to claim 1, wherein the following conditional expression is satisfied:

$$-4.50<M2/f2<-2.50,$$

where M2 represents the amount of movement of the lens unit which is moved by the largest amount during zooming from the wide angle end to the telephoto end among the at least one lens unit included in the second lens group, and f2 represents a combined focal length of the lens units of the second lens group at the wide angle end in which focus is at infinity.

7. The zoom lens according to claim 1, wherein the following conditional expression is satisfied:

$$-4.00<(1-\beta 4w^2)\times \beta Rw^2<-1.40,$$

where β4w represents a lateral magnification of the fourth lens group at the wide angle end, and βRw represents a lateral magnification of the rear lens group at the wide angle end.

8. The zoom lens according to claim 1, further comprising an aperture stop arranged between the second lens group and the third lens group.

9. The zoom lens according to claim 8, wherein the aperture stop is not moved in an optical axis direction for zooming.

10. An image pickup apparatus, comprising:
a zoom lens, comprising, in order from an object side to an image side:
   a first lens group which is not moved for zooming and is composed of a single lens unit having a positive refractive power;
   a second lens group which has a negative refractive power and comprises at least one lens unit each of which is moved toward an image side during zooming from a wide angle end to a telephoto end;
   a third lens group which has a positive refractive power and comprises at least one lens unit each of which is moved toward the object side during zooming from the wide angle end to the telephoto end;
   a fourth lens group which is configured to move during zooming and focusing and is composed of a single lens unit having a negative refractive power; and
   a rear lens group which is composed of at least one lens unit,
   wherein intervals between adjacent lens units are changed during zooming,
   wherein the first lens group comprises at least three lenses, and
   wherein the following conditional expressions are satisfied:

$$4.80<f1/fw<8.00;$$

$$-5.00<M2/Mv<-1.50;$$

$$-3.50<Mv/fw<-0.77; \text{ and}$$

$$0.99<Nd1pr/Nd1pf<1.40,$$

where f1 represents a focal length of the first lens group, fw represents a focal length of the zoom lens at the wide angle end, M2 represents an amount of movement of a lens unit which is moved by a largest amount during zooming from the wide angle end to the telephoto end among the at least one lens unit included in the second lens group, Mv represents an amount of movement of a lens unit which is moved by a largest amount during zooming from the wide angle end to the telephoto end among lens units which are moved toward an object side during zooming from the wide angle end to the telephoto end, Nd1pr represents a refractive index with respect to a d-line of a material of a positive lens G1pr arranged closest to the image side in the first lens group, Nd1pf represents an average of refractive indices with respect to the d-line of materials of positive lenses included in the first lens group other than the positive lens G1pr, and a sign of an amount of movement of a lens unit is defined as positive when the lens unit is located closer to the image side at the telephoto end than at the wide angle end; and
   an image pickup element configured to receive light of an image formed by the zoom lens.

\* \* \* \* \*